US007185909B2

(12) United States Patent
Espenshade et al.

(10) Patent No.: US 7,185,909 B2
(45) Date of Patent: Mar. 6, 2007

(54) STROLLER WITH DROP-DOWN BASKET

(75) Inventors: Gregg R. Espenshade, Narvon, PA (US); Gregory S. Sellers, Christiana, PA (US); Curtis M. Hartenstine, Birdsboro, PA (US)

(73) Assignee: Graco Children's Products Inc., Exton, PA (US)

( * ) Notice: Subject to any disclaimer, the term of this patent is extended or adjusted under 35 U.S.C. 154(b) by 0 days.

(21) Appl. No.: 11/272,753

(22) Filed: Nov. 15, 2005

(65) Prior Publication Data

US 2006/0066077 A1 Mar. 30, 2006

Related U.S. Application Data

(62) Division of application No. 10/396,331, filed on Mar. 26, 2003, now Pat. No. 7,073,815.

(60) Provisional application No. 60/374,824, filed on Apr. 24, 2002.

(51) Int. Cl.
*B62B 7/06* (2006.01)
(52) U.S. Cl. ............ 280/642; 280/650; 280/647; 280/639
(58) Field of Classification Search ........ 280/642, 280/650, 652, 647, 644, 47.38, 638, 639, 280/38, 641, 657, 658, 47.371, 47.37, 47.36; 297/130, 16.1, 16.2
See application file for complete search history.

(56) References Cited

U.S. PATENT DOCUMENTS

| 4,317,581 A | | 3/1982 | Kassai | |
|---|---|---|---|---|
| 4,346,912 A | | 8/1982 | Habib | |
| 4,435,012 A | * | 3/1984 | Kassai | 297/354.12 |
| 4,491,335 A | | 1/1985 | Evron | |
| 4,538,830 A | * | 9/1985 | Nakao et al. | 280/647 |
| 4,632,421 A | * | 12/1986 | Shamie | 280/642 |
| 4,741,551 A | * | 5/1988 | Perego | 280/642 |
| 4,763,919 A | | 8/1988 | Nakao et al. | |
| 4,817,982 A | * | 4/1989 | Kassai | 280/644 |
| 4,828,278 A | | 5/1989 | Nakao et al. | |
| D305,218 S | | 12/1989 | Nakao et al. | |
| 4,923,208 A | | 5/1990 | Takahashi et al. | |
| 4,930,697 A | | 6/1990 | Takahashi et al. | |

(Continued)

FOREIGN PATENT DOCUMENTS

EP 483042 A1 4/1992

(Continued)

*Primary Examiner*—J. Allen Shriver
(74) *Attorney, Agent, or Firm*—Lempia Forman LLC

(57) ABSTRACT

A foldable stroller with a basket, the basket having a frame with left and right side legs pivotally mounted to the stroller frame for movement between an upper position and a lower position. The legs of the basket frame are supported on side members of the stroller frame that pivot as the stroller frame moves between its folded and open positions, so that folding or unfolding of the stroller frame effects pivotal movement of the basket frame between its lower and upper positions. In another form, a stroller with a basket has handle-operated support members for the side legs of the basket frame that selectively support the basket frame in an upper position, and allow the basket frame to drop to a lower position for easier access to basket interior through the upper opening of the basket.

10 Claims, 29 Drawing Sheets

U.S. PATENT DOCUMENTS

| | | | |
|---|---|---|---|
| 4,953,887 A * | 9/1990 | Takahashi et al. | 280/647 |
| 5,110,150 A | 5/1992 | Chen | |
| 5,427,402 A | 6/1995 | Huang | |
| 5,447,323 A * | 9/1995 | Huang | 280/642 |
| 5,454,584 A | 10/1995 | Haut et al. | |
| 5,482,311 A * | 1/1996 | Huang | 280/642 |
| 5,513,864 A | 5/1996 | Huang | |
| 5,605,409 A | 2/1997 | Haut et al. | |
| 5,622,377 A | 4/1997 | Shamie | |
| 5,645,293 A | 7/1997 | Cheng | |
| 5,718,444 A | 2/1998 | Huang | |
| 5,722,682 A * | 3/1998 | Wang | 280/642 |
| 5,725,238 A * | 3/1998 | Huang | 280/642 |
| 5,741,021 A | 4/1998 | Saint et al. | |
| 5,845,924 A | 12/1998 | Huang | |
| 5,876,046 A | 3/1999 | Courtney et al. | |
| 5,882,030 A | 3/1999 | Haut | |
| 5,893,577 A | 4/1999 | Takahashi | |
| 5,938,230 A | 8/1999 | Huang et al. | |
| 5,954,404 A | 9/1999 | Suzuki | |
| 5,988,669 A | 11/1999 | Freese et al. | |
| 5,988,670 A | 11/1999 | Song et al. | |
| 6,045,145 A | 4/2000 | Lan | |
| 6,062,588 A | 5/2000 | Cheng | |
| 6,062,589 A * | 5/2000 | Cheng | 280/647 |
| 6,073,957 A | 6/2000 | Lan | |
| 6,086,087 A * | 7/2000 | Yang | 280/658 |
| 6,095,548 A | 8/2000 | Baechler | |
| 6,099,019 A | 8/2000 | Cheng | |
| 6,102,432 A | 8/2000 | Cheng | |
| 6,105,998 A | 8/2000 | Baechler et al. | |
| 6,116,624 A * | 9/2000 | Hu | 280/47.371 |
| 6,120,041 A | 9/2000 | Gehr, Jr. et al. | |
| 6,135,487 A | 10/2000 | Flannery et al. | |
| 6,139,046 A | 10/2000 | Aalund et al. | |
| 6,152,340 A | 11/2000 | Chen et al. | |
| 6,155,592 A | 12/2000 | Hsia | |
| 6,155,740 A | 12/2000 | Hartenstine | |
| 6,189,914 B1 | 2/2001 | Worth et al. | |
| 6,241,273 B1 | 6/2001 | Gehr | |
| 6,267,406 B1 * | 7/2001 | Huang | 280/647 |
| 6,273,451 B1 | 8/2001 | Julien et al. | |
| 6,276,709 B1 | 8/2001 | Chen et al. | |
| 6,286,844 B1 | 9/2001 | Cone, II et al. | |
| 6,361,056 B1 * | 3/2002 | Chen et al. | 280/47.4 |
| 6,464,244 B1 * | 10/2002 | Cheng | 280/650 |
| 6,530,591 B2 * | 3/2003 | Huang | 280/650 |
| 6,626,451 B1 * | 9/2003 | Song | 280/642 |
| 6,698,788 B2 * | 3/2004 | Yang | 280/647 |
| 6,851,700 B2 * | 2/2005 | Yoshie et al. | 280/642 |
| 6,910,708 B2 * | 6/2005 | Sack et al. | 280/642 |
| 2001/0013688 A1 | 8/2001 | Warner, Jr. et al. | |
| 2001/0013689 A1 | 8/2001 | Cone, II et al. | |
| 2001/0040357 A1 | 11/2001 | Barrett et al. | |
| 2002/0005628 A1 | 1/2002 | Hartenstine et al. | |
| 2002/0084626 A1 * | 7/2002 | Ageneau | 280/642 |
| 2002/0093178 A1 | 7/2002 | Turner et al. | |
| 2002/0109321 A1 | 8/2002 | Turner et al. | |
| 2002/0195797 A1 * | 12/2002 | Song | 280/642 |
| 2003/0094791 A1 * | 5/2003 | Hartenstine et al. | 280/642 |
| 2003/0122351 A1 * | 7/2003 | Yeh | 280/642 |
| 2003/0201626 A1 | 10/2003 | Hartestine et al. | |
| 2004/0026895 A1 * | 2/2004 | Cheng | 280/642 |
| 2004/0046364 A1 | 3/2004 | Chen | |
| 2004/0090046 A1 * | 5/2004 | Hartenstine et al. | 280/642 |
| 2004/0124611 A1 * | 7/2004 | Gong et al. | 280/642 |
| 2004/0183275 A1 * | 9/2004 | Chen | 280/642 |
| 2005/0098983 A1 * | 5/2005 | Cheng et al. | 280/642 |

FOREIGN PATENT DOCUMENTS

| | | |
|---|---|---|
| EP | 1 153 817 A1 | 11/2001 |
| WO | WO 03/035448 A | 5/2003 |

* cited by examiner

STROLLER WITH DROP-DOWN BASKET

This application is a divisional of application Ser. No. 10/396,331, filed Mar. 26, 2003 now U.S. Pat. No. 7,073,815, hereby incorporated by reference, which claims the benefit of U.S. Provisional Application No. 60/374,824, filed Apr. 24, 2002.

BACKGROUND

The present invention relates to strollers for children, e.g., strollers that are easily folded to a stored, compact configuration.

A well-designed stroller of this type should be sturdy and balanced. It should afford the child passenger safe and comfortable transport. The adult user should find the stroller easy to maneuver, easy to fold and unfold, and easy to handle when folded. It should have features that make it versatile and convenient. And it should be simple in design, rugged and reliable. Foldable strollers are known that address some of these criteria. There is room for improvement, however, in all of these areas.

Strollers are known which incorporate a basket underneath the seat or backrest for holding objects. U.S. Pat. No. 4,828,278 discloses one example of a top-loading basket located behind the seat, under the backrest. The frame of the basket defines the top opening of the basket, and must be manually pivoted and secured to the rear of the backrest when the stroller is folded. The basket cannot hold elongated objects because it does extend under the seat. U.S. Pat. No. 5,741,021 discloses a stroller having an elongated and fairly deep basket that extends beneath the seat and the backrest. Easier access to the top opening of the basket is afforded by a pivoted, break-away basket frame that is forced past stops to move between an upper (closed) position and a lower (open) position.

SUMMARY OF THE INVENTION

According to one aspect, the invention is a stroller comprising a stroller frame foldable between an open position and a folded position, and a basket frame, adapted to support a basket, having left and right side legs pivotally mounted to the stroller frame for movement between an upper position and a lower position. The stroller frame has left and right side members that are pivoted to other portions of the frame and are adapted to pivot downwardly as the stroller frame moves to its folded position, and upwardly as the stroller frame moves to its open position. The left and right side members have left and right protrusions, respectively, on their inboard faces, and the left and right side legs of the basket frame are slidably supported on the left and right protrusions, respectively. Pivotal movement of the side members during folding or unfolding of the stroller frame therefore effects pivotal movement of the basket frame between its upper and lower positions.

The basket frame may have an end portion that is joined to the side legs remotely from their pivotal mountings so as to form a U-shaped basket frame. The side legs of the basket frame may be pivoted toward the front of the stroller frame, with the end portion of the basket frame disposed toward the rear of the stroller frame.

According to another aspect, the invention is a stroller comprising a stroller frame; a basket frame adapted to support a basket; at least one support member for supporting the basket frame on the stroller frame; and a handle operatively connected to the support member. The basket frame is pivotally mounted to the stroller frame for movement between an upper closed position and a lower open position. The support member is movable by means of the handle between a first position for holding the basket frame in the closed position, and a second position in which the basket frame can move to the open position. position. This basket arrangement can be incorporated in foldable as well as non-foldable strollers.

The basket frame preferably comprises left and right side legs pivotally mounted to opposite sides of the stroller frame. Separate support members are respectively associated with each of the side legs, and the handle is operatively connected to both support members. Each support member preferably is movable relative to its respective side leg, and is adapted to releasably engage the stroller frame. Each support member may be in the form of a sliding, spring-loaded collar that is adapted to engage a protrusion on the stroller frame when in the first position, and to disengage from the protrusion when in the second position.

The basket frame may have an end portion that is joined to the side legs remotely from their pivotal mountings so as to form a U-shaped basket frame, with the handle located adjacent the end portion. The side legs of the basket frame may be pivoted toward the front of the stroller frame, with the end portion of the basket frame and the handle disposed toward the rear of the stroller frame.

BRIEF DESCRIPTION OF THE DRAWING FIGURES

An embodiment that incorporates the best mode for carrying out the invention is described in detail below, purely by way of example, with reference to the accompanying drawing, in which.

Figure 1:
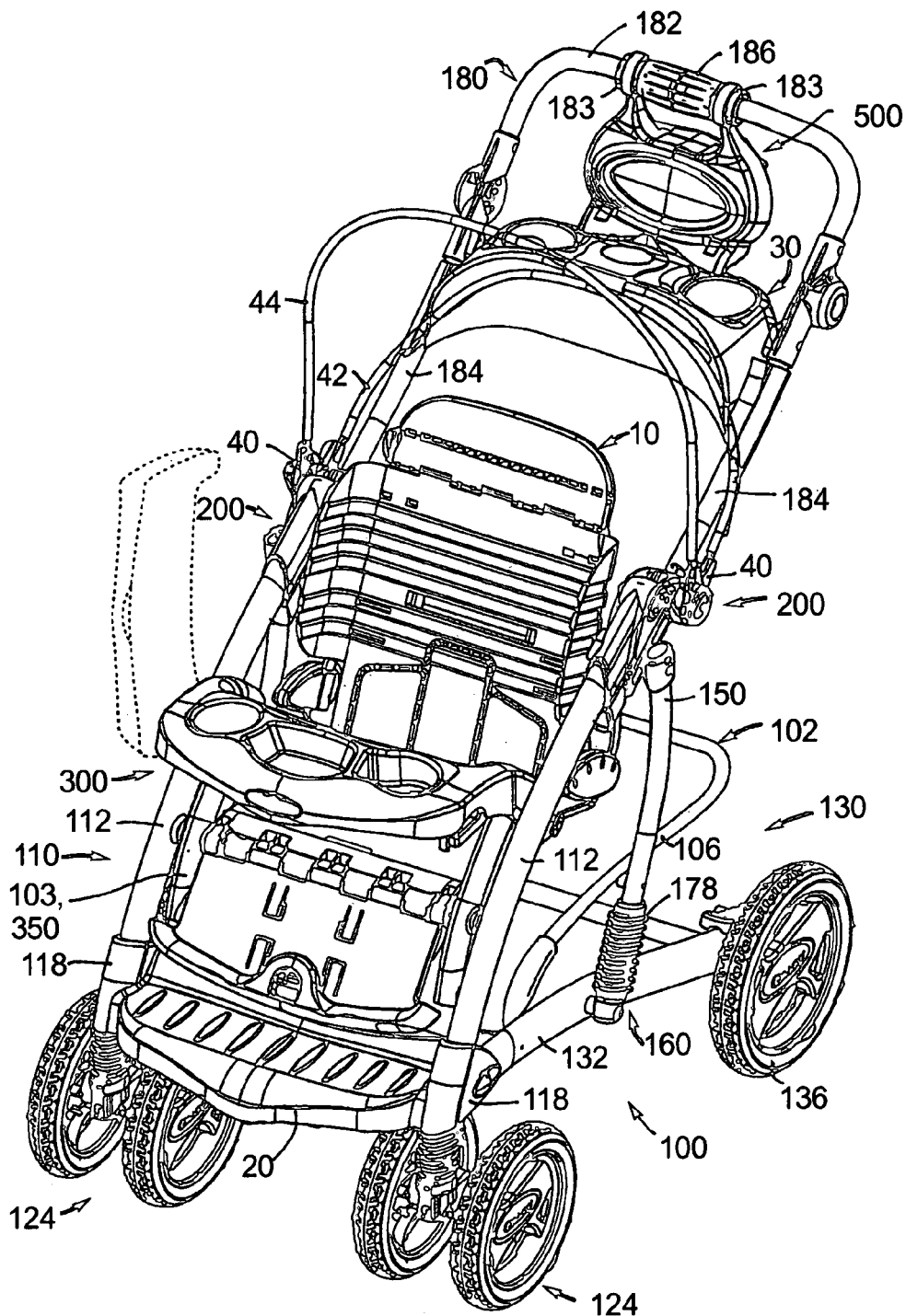
FIG. 1 is a front perspective view of a stroller according to the invention.

It is to be understood that the invention is not limited in its application to the details of construction and the arrangement of components of the preferred embodiment described below and illustrated in the drawing figures. Those skilled in the art will recognize that various modifications can be made without departing from the scope of the invention, which is defined by the appended claims.

DETAILED DESCRIPTION

Referring to FIG. 1, a stroller according the invention comprises a wheeled, foldable frame 100 that supports an adjustable child seat 10, a footrest 20, a parent console 30, a child tray 300 and an accessory bridge 500. The frame components preferably are made of tubular aluminum, but steel or other materials may be used provided they afford sufficient strength and rigidity. A basket (not shown) may also be supported on the frame, below the seat 10, as discussed below. Frame fold latches 200 lock the frame in its open position, and selectively allow it to be folded to a closed, compact configuration. Canopy support bars 42, 44 are adjustably attached to pivots 40 on the fold latches. For the sake of clarity, none of the soft goods associated with the stroller (e.g., canopy, seat cushions, basket) is shown in the figures.

Frame, Suspension and Basket

Referring to FIGS. 1–5, the stroller frame 100 comprises a front leg assembly 110, a rear leg assembly 130, side support struts 150 and a U-shaped handle 180. Fold latches 200 at each side of the frame pivotally link together the front leg assembly 110, the support struts 150 and the handle 180, as described below.

The front leg assembly 110 comprises left and right tubular front legs 112. The front legs are rigidly interconnected, e.g., by welding, by a lower front cross-tube 114 and an intermediate cross-tube 116 (see FIG. 5). A clevis-type hinge bracket 118 is riveted to the lower part of each front leg 112 to provide hinge points 120 for the rear leg assembly 130. The lower end 111 of each front leg 112 necks down and is joined, e.g., by riveting or welding, to a vertical spindle 122. A duplex caster 124 is mounted to each spindle 122 in a conventional manner. Alternatively, the casters 124 could be mounted on spindles that are fixed to the front portion of the rear leg assembly. The upper end of each front leg necks down and is anchored to the upper part 202 of a respective fold latch 200 (see FIG. 7). The details of this anchorage are described below.

Rear leg assembly 130 comprises left and right tubular rear legs (bottom members) 132. These are rigidly interconnected at their rear ends, e.g., by welding, by a rear cross-tube 134. The cross-tube serves as an axle support for rear wheels 136. The front ends of rear legs 132 are riveted to hinge brackets 118 at hinge points 120, near the lower ends of front legs 112. This arrangement results in the rear legs being disposed at a shallow angle to the horizontal.

Figure 12:
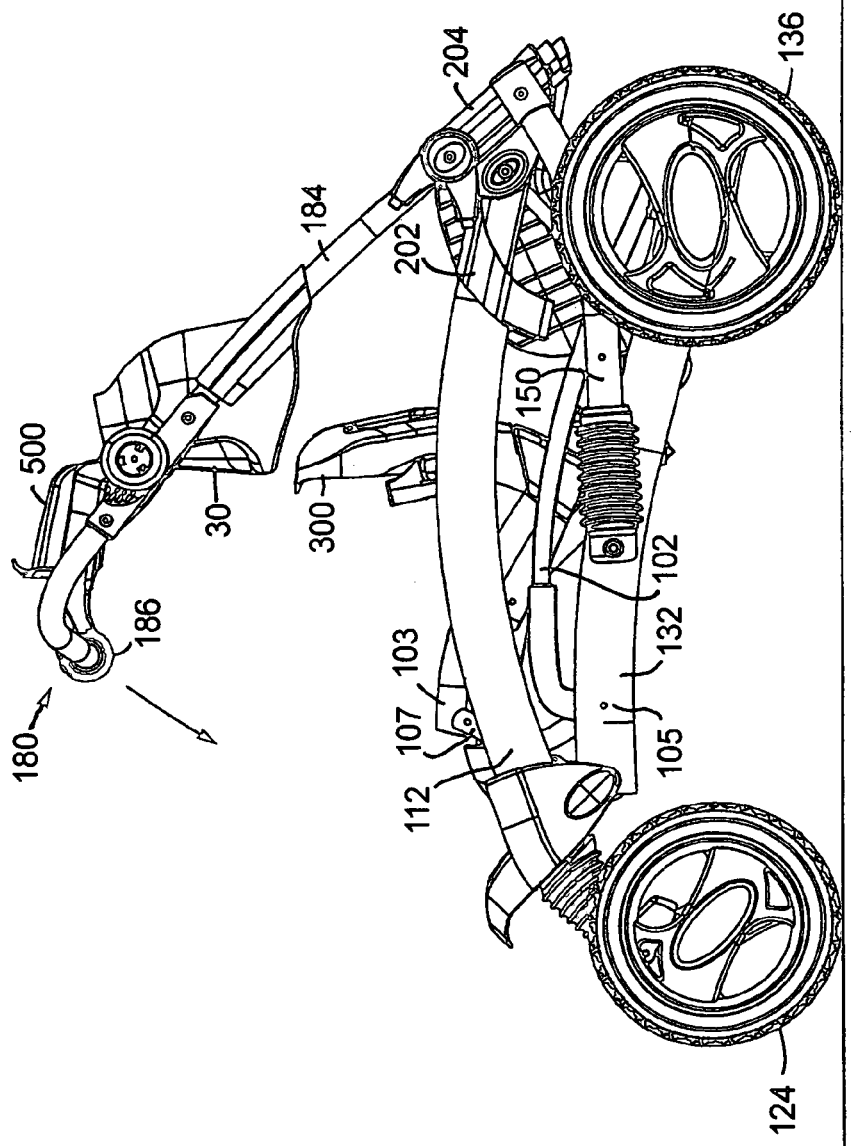
Figure 13:
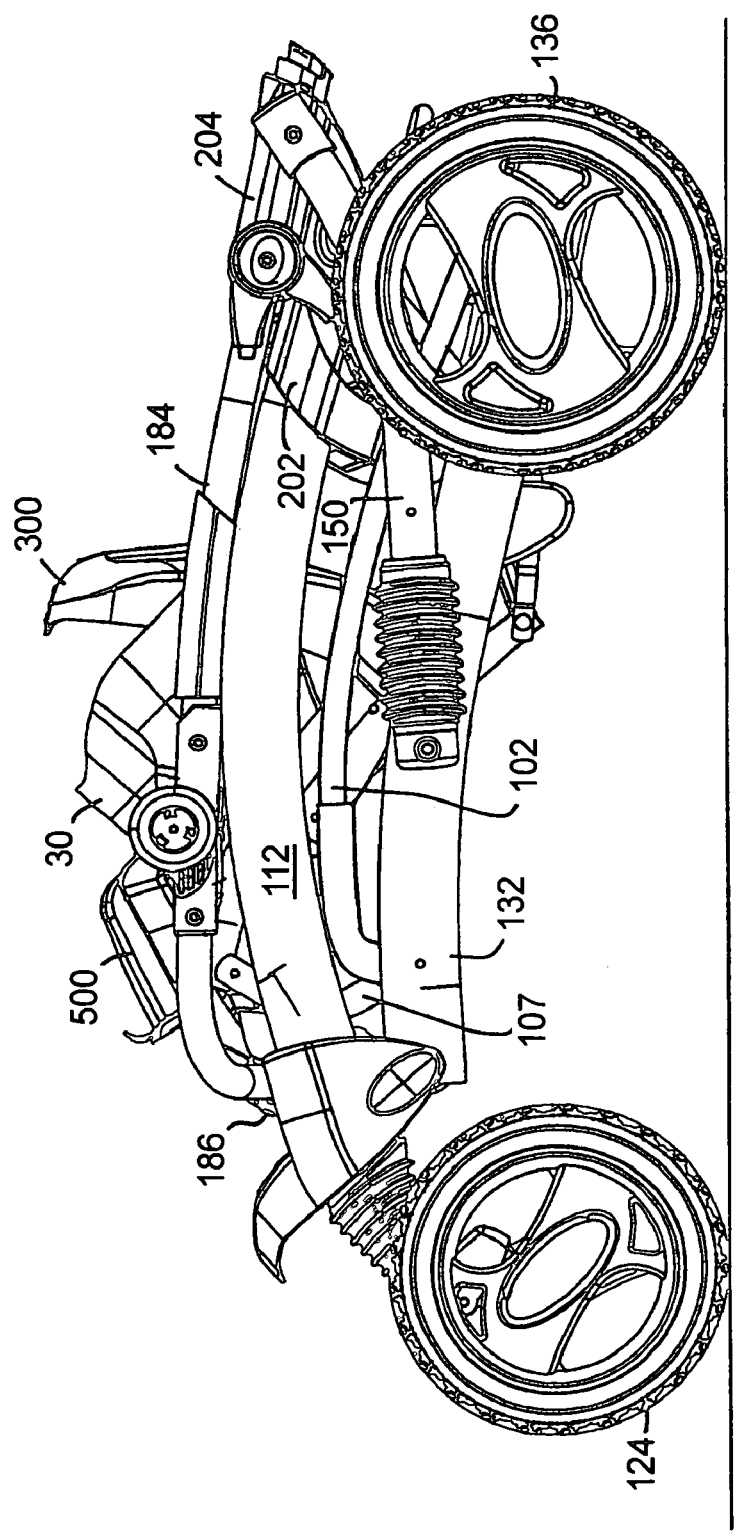

Front legs 112 and rear legs 132 preferably have cross-sections that are oblong or oval, e.g., elliptical. Such sections have a stronger section modulus as compared to round tubing having the same cross-sectional area. This configuration enhances vertical load strength, which is especially important for the rear legs given their shallow angle. It also gives the stroller frame profile a more robust appearance. It is also preferred that the front legs and the rear legs be about the same length, so that they fold compactly onto each other (see FIGS. 12, 13).

The rear legs 132 preferably are bowed upwardly, i.e., convex side up, as depicted in the figures. An upwardly bowed leg provides greater ground clearance between the front and the rear wheels than a straight leg. The upward bow facilitates the traverse of curbs and other high obstacles. Although the front legs could be straight, they preferably are curved, as depicted. When both the front legs and the rear legs are curved, it is preferred that they be substantially similar, i.e., have roughly the same curvature, as depicted, which enables them to nest more compactly when folded (see FIGS. 12, 13).

The hinge arrangement 118, 120 that joins the front leg assembly to the rear leg assembly places the front legs 112 in line with the rear legs 132. Alternatively the leg assemblies could be configured and hinged such that the front legs and the rear legs are mounted side-by-side, rather than in line.

Figure 7:
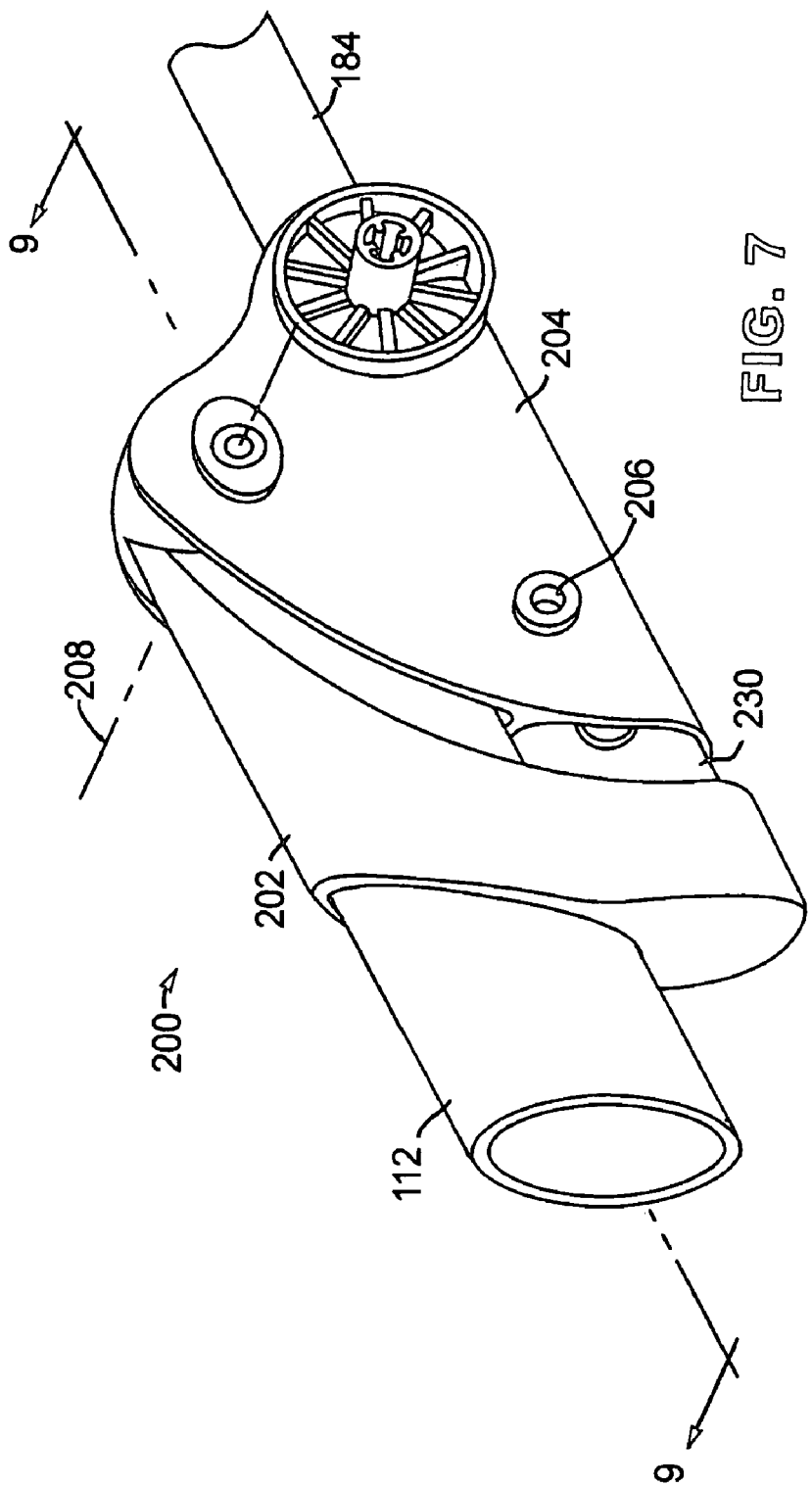
FIG. 7 is a perspective view of a frame latch according to the invention.
Figure 8:
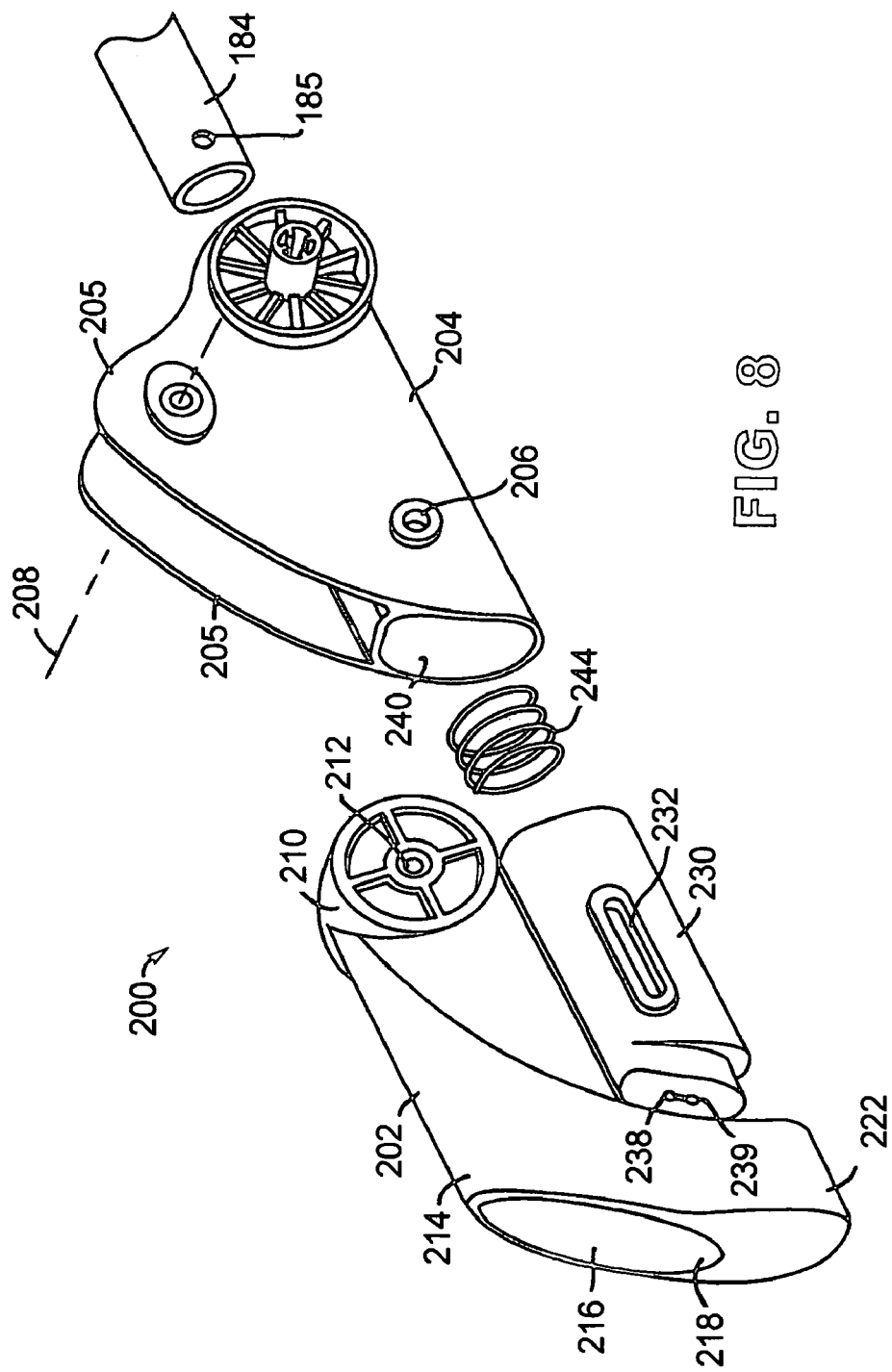
FIG. 8 is an exploded view of the frame latch of FIG. 7.

Each support strut 150 is in the form of a tubular member pivotally connected (e.g., riveted) at its upper end 152 to the lower part 204 of fold latch 200, at pivot point 206 (see FIG. 7). The lower end 154 of the support strut may be pivotally connected, e.g., by a rivet 156 through holes 157, directly to its respective rear leg 132, but it is preferred to interpose a compliant suspension 160 that helps to isolate the seat 10 from the ground and soften the ride over rough terrain. Irrespective of whether a suspension is used, the location of the pivotal connection point 158 on the rear leg 132 preferably is chosen such that the frame components fold together compactly. The support struts 150, instead of being pivoted to the outboard faces of the legs 112, 132 as depicted in the figures, instead could be pivoted to the inboard faces of the legs 112, 132, or could be pivoted through hinge brackets so that they are in line with the legs.

Figure 6:
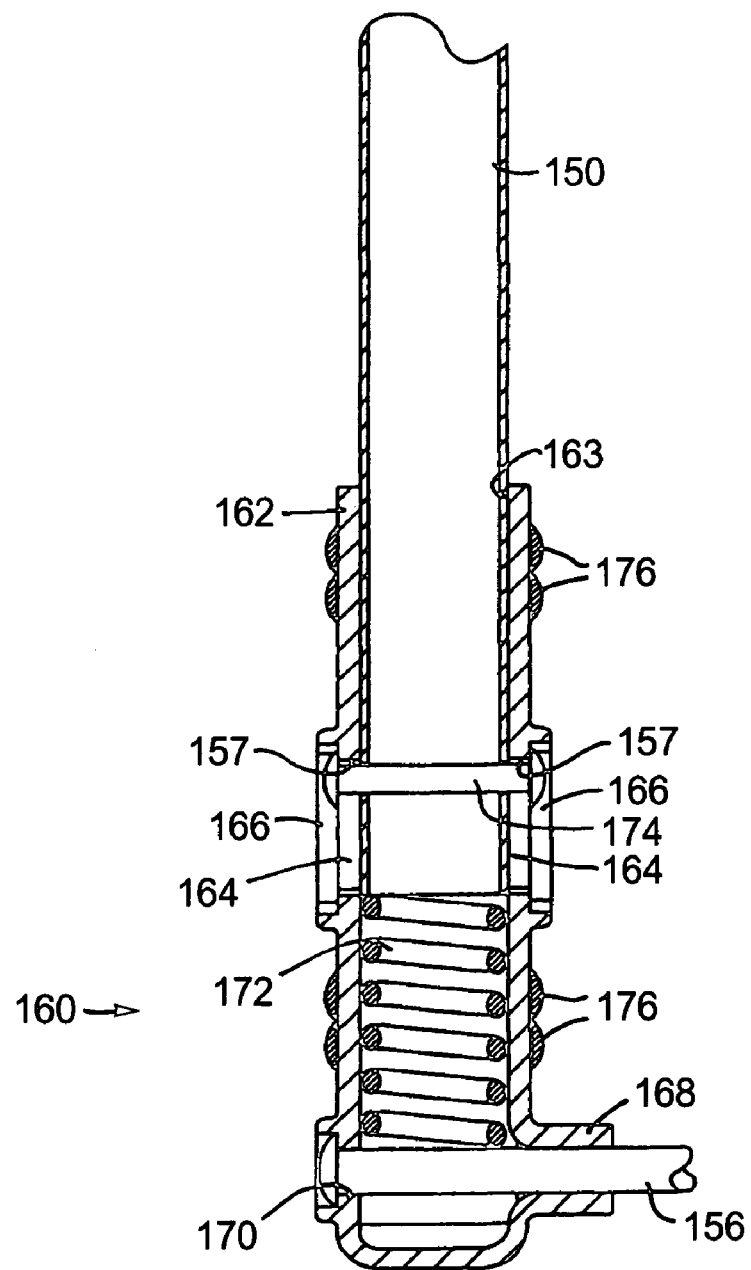
FIG. 6 is a sectional view through a suspension assembly according to the invention taken along line 6—6 in FIG. 5.

Referring to FIG. 6, the suspension 160 comprises a housing 162 having an upper opening 163, slots 164, each surrounded by a shoulder 166, an apertured mounting boss 168, and a rivet hole 170 aligned with boss 168. Support strut tube 150 fits slidably within housing 162. A helical compression spring 172 is located in the bottom of housing 162, and abuts the lower end of the strut tube 150. Rivet 156 passes through hole 170 and mounting boss 168 to pivotally secure the housing 162 to the rear leg 132. The lower end of the spring 172 can rest on rivet 156, as depicted, or it can rest on a lug or other protrusion within the housing (not shown).

A rivet 174 passing through holes 157 in the strut tube and slots 164 in the housing retains the strut tube 150 in the housing, and limits suspension travel. The heads of the rivet 174 are surrounded by the shoulders 166, and the ends of the slots 164 define stops which limit movement of the rivet 174 and, hence, the strut tube 150 relative to housing 162. The spring rate is selected to allow spring 172 to compress somewhat under normal loading and use conditions, preferably without quite reaching the limit of suspension travel. External ribs 176 on the housing provide anchor points for a bellows-type cover 178 that keeps dirt and dust from entering the housing through the slots 164.

A U-shaped basket frame 102 is adapted to support a utility basket beneath the seat 10. The front ends 104 of the basket frame are pivotally attached to the rear legs at rivet points 105 (see FIG. 4). Each side leg 106 of the basket frame rests on a protrusion 153 on the inboard face of a respective support strut 150. When the stroller is folded, the protrusions rotate downwardly with the support struts, moving along the basket frame legs 106 and allowing the basket frame to drop and nest between the front and rear leg assemblies.

Figure 30:
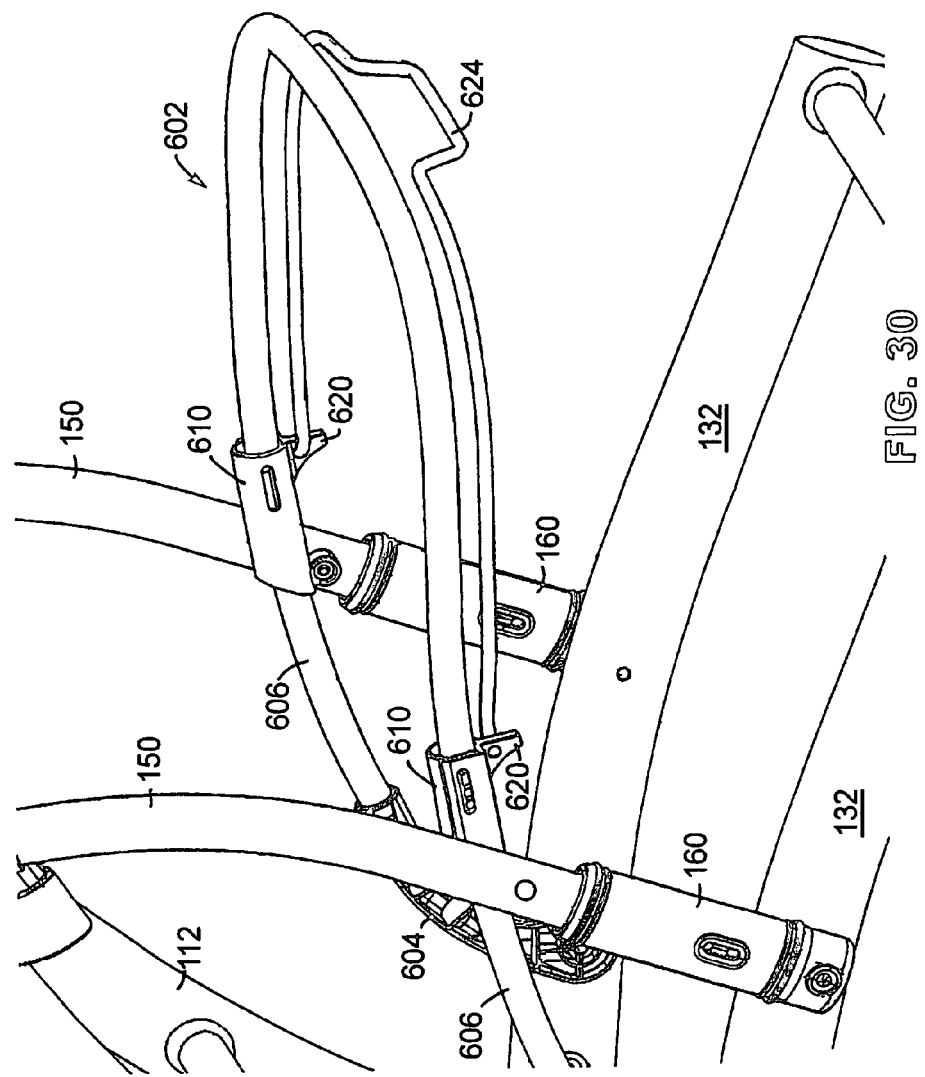
FIG. 30 is a perspective view of a modified basket frame arrangement.
Figure 31:
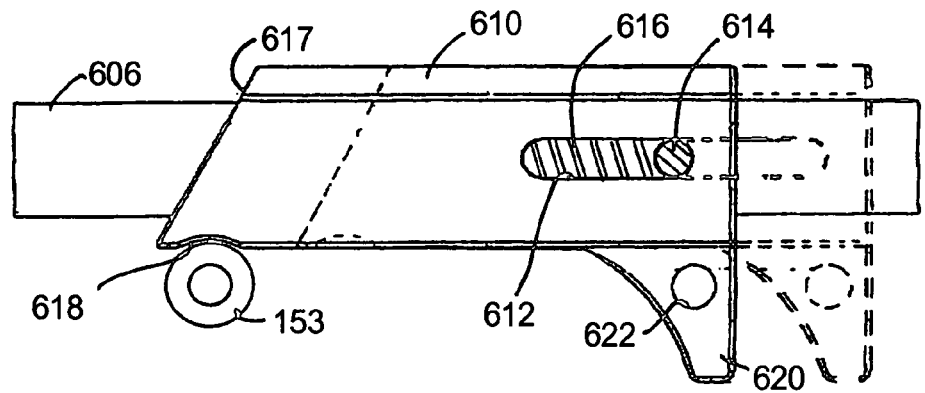
FIG. 31 is a side elevational view of a component of the basket frame arrangement of FIG. 30.
Figure 32:
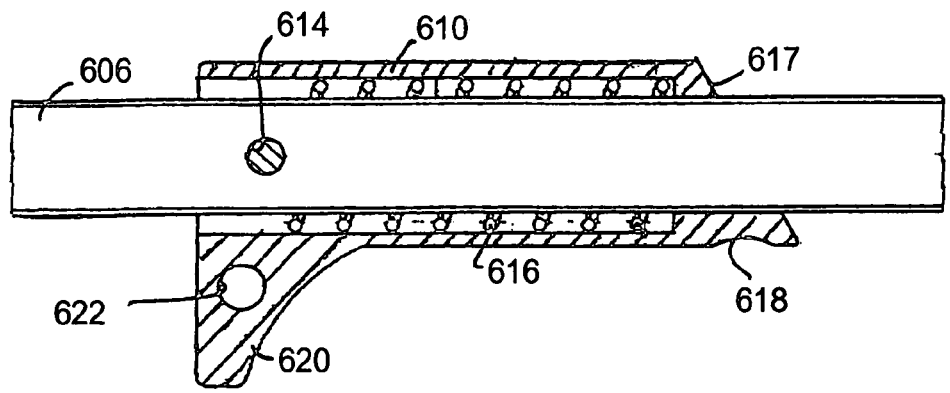
FIG. 32 is a longitudinal sectional view through the component of FIG. 31.

An alternative basket frame arrangement, illustrated in FIGS. 30–32, has a basket release mechanism that allows the user to drop the basket frame (and its flexible basket) when the stroller is open to afford easier access to the interior of the basket. In this "easy access" arrangement, basket frame 602 is pivoted at its front ends 604 to rear legs 132 as in the first embodiment. However, the side legs 606 of this basket frame are more closely spaced, at least in the vicinity of support struts 150, so that the side legs themselves fit between the protrusions 153 on support struts 150 and would drop below the protrusions if not otherwise supported. Support for the side legs 606 instead is provided by a sliding collar 610 on each side leg 606 at the location of the support strut 150. The sliding collars 610 are wide enough to substantially fill the spaces between the side legs 606 and the support struts 150, so that the sliding collars themselves engage the protrusions 153 and thus support the side legs 606.

Referring to FIGS. 31 and 32, sliding collar 610 is hollow and has a longitudinal slot 612 on each side thereof. A rivet 614 fixed to the side leg 606 passes through the slots 612 to guide and limit movement of the collar. A compression spring 616 is captured between the rivet 614 and the end of the collar 610 to bias the collar forwardly. The front end of the collar 610 has a ramped face 617. A curved seat 618 on the bottom of the collar 610 engages the protrusion 153 on support strut 150 when the collar 610 is in its forward (first) position. A tab 620 at the rear of collar 610 has a hole 622. A U-shaped wire handle 624 engages holes 622 and extends to the rear of the stroller.

In operation, a rearward pull on handle 624 pulls sliding collars 610 rearwardly to a second position in which their front ends clear protrusions 153 (dashed line position shown in FIG. 31). This allows the basket frame 602 to drop to an "open" position, affording easier access to the interior of the soft basket (not shown). An upward pull on the rear of basket frame 602 brings the ramped front faces 617 of collars 610 into engagement with protrusions 153. This forces the collars rearwardly until they clear the protrusions 153, at which point springs 616 return them to their forward (first) positions, supported on protrusions 153, with the basket frame 602 in a "closed" position.

Returning to FIGS. 1–5, U-shaped handle 180 is a hollow tubular member, preferably of round cross-section, that comprises an upper handgrip portion 182 and two push arms 184, each anchored to the lower part 204 of a respective fold latch 200 (see FIG. 7). The push arms preferably are about the same length as the front legs 112 and the rear legs 132 so that they fold compactly onto each other (see FIGS. 12, 13). Concealed actuating cables extend from the latches 200 through the push arms to the handgrip portion 182. Latch release (for folding) is accomplished by twisting an actuator in the form of a rotatable grip 186, which pulls the cables to release the latches, as described below. Details of the cable-operated, one-hand release mechanism are disclosed in commonly owned U.S. Pat. No. 6,068,284, which is incorporated herein by reference.

Referring to FIG. 7, the two parts 202, 204 of each fold latch are hinged together by a rivet along a pivot axis 208. On each side of the stroller, therefore, there is a foldable four-bar linkage consisting of front leg 112, rear leg 132, support strut 150, and the lower part 204 of fold latch 200 (which has a length equal to the distance between pivot point 206 and pivot axis 208).

Figure 15:
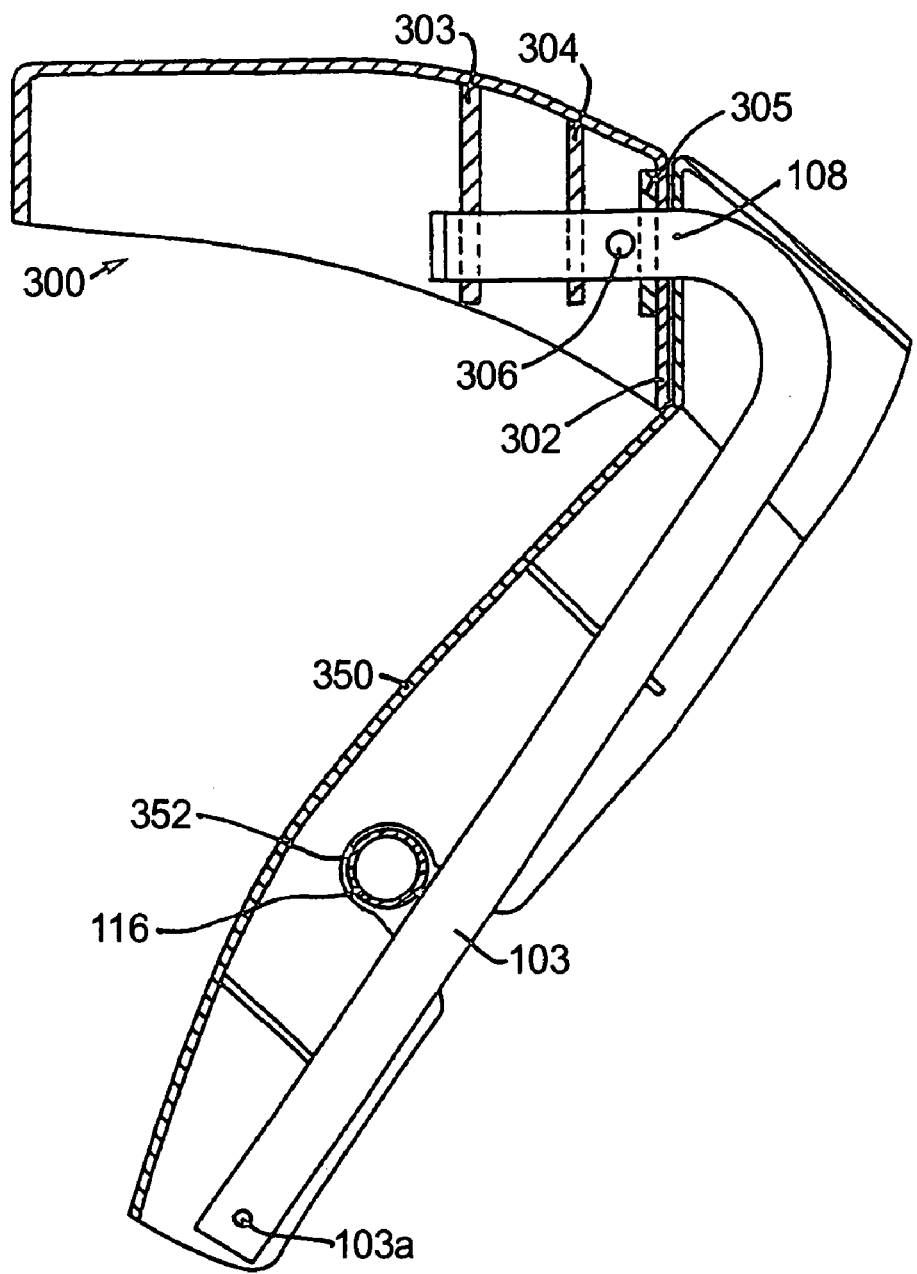
FIG. 15 is a sectional view of the child tray according to the invention taken along line 15—15 in FIG. 2.

Each side of child tray 300 is supported on another foldable four-bar linkage. Two of the links are the front leg 112 and the rear leg 132. The third link is a tube 103 (see FIGS. 1, 2) that is pivoted relative to the front leg assembly at the location of intermediate cross-tube 116. FIG. 15 shows this arrangement at the right side of the stroller (the left side is similar). A plastic fairing 350 is attached to tube 103 and has an arcuate notch 352 that receives intermediate cross-tube 116, whereby the fairing 350 together with the tube 108 can pivot about cross-tube 116. The fourth link is a curved flat link 107 (see FIG. 4) that is pivoted at its lower end to rear leg 132 at rivet point 105, and at its upper end to the lower end of tube 103, at hole 103a (FIG. 15).

Figure 4:
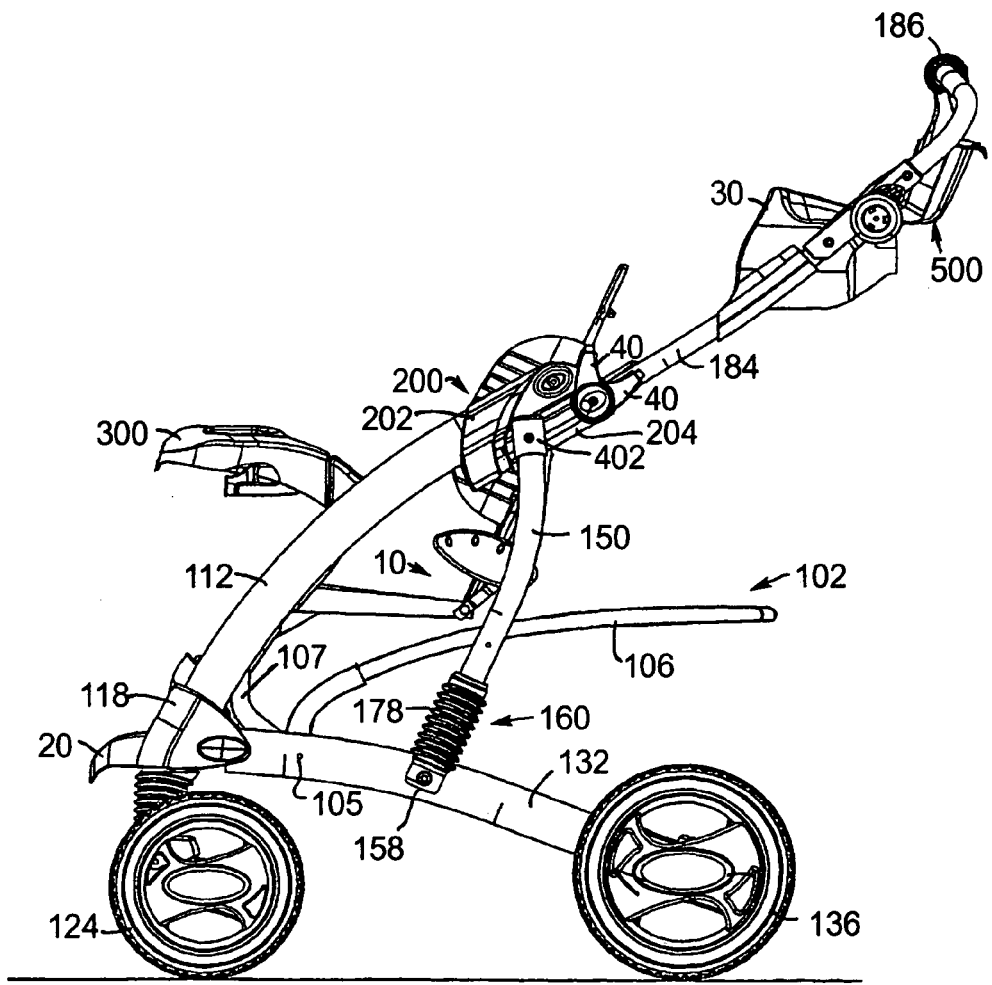
FIG. 4 is a left side elevational view of the stroller.
Figure 5:
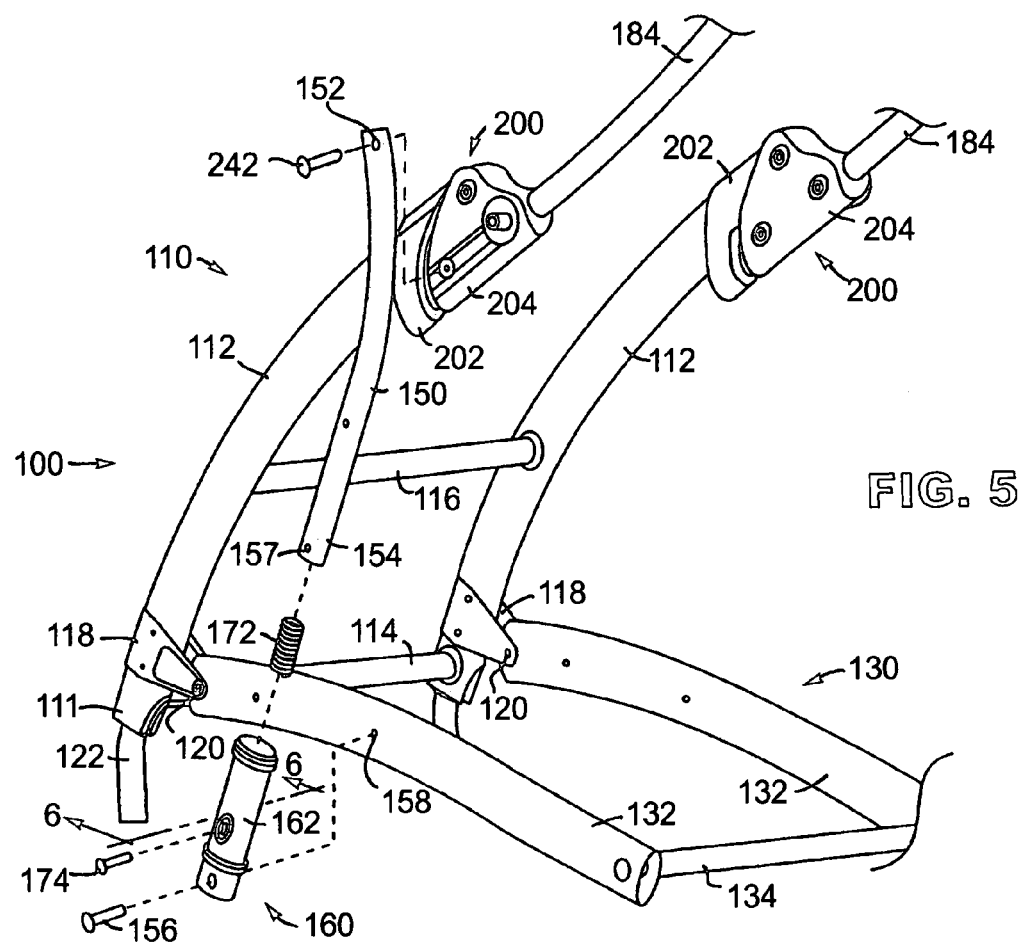
FIG. 5 is an exploded view of the stroller frame.
Figure 11:
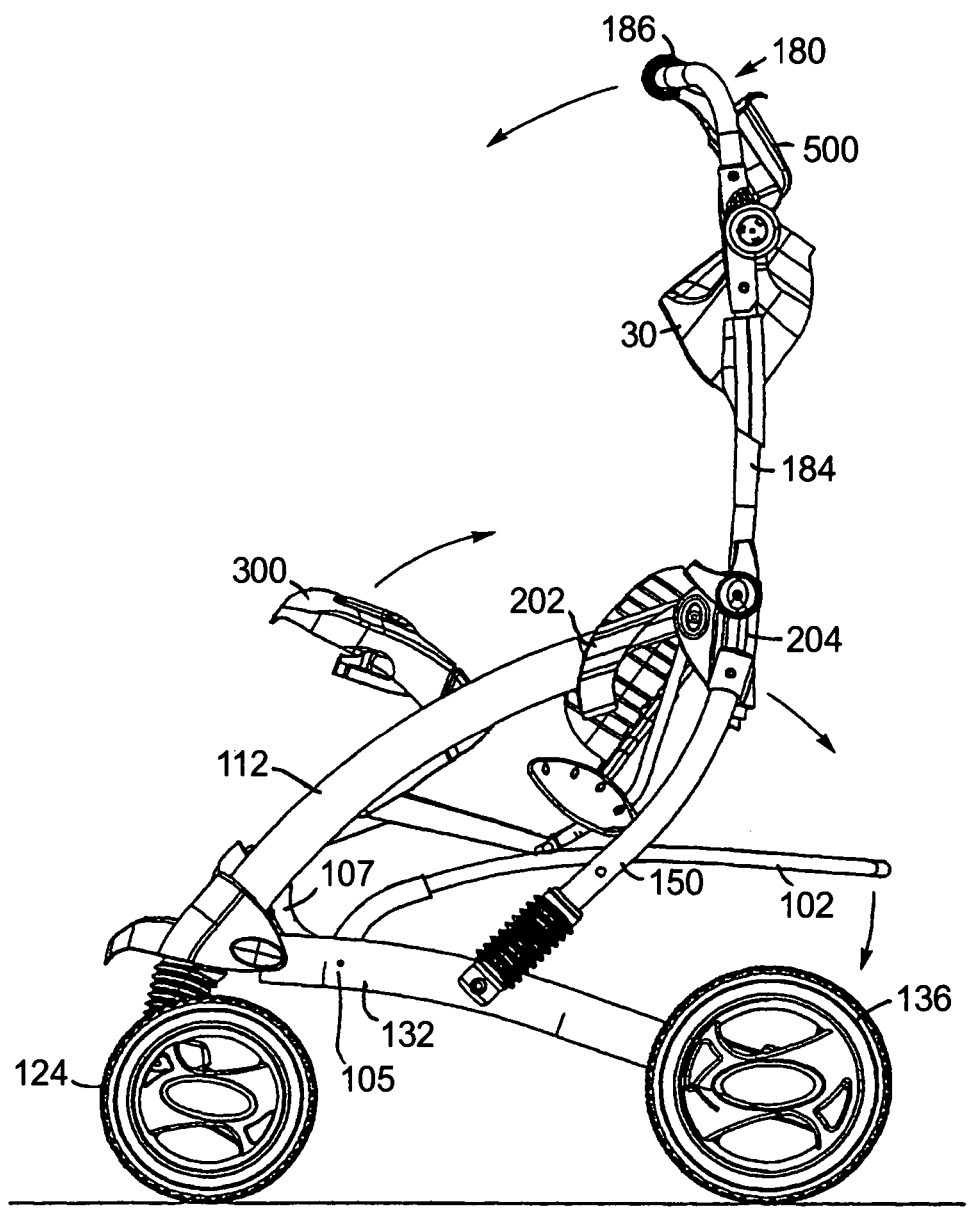
FIGS. 11–13 are side elevational views of the stroller shown in different folding stages.

The side elevational view of FIG. 4 best illustrates the frame geometry in the fully open position. Folding of the stroller is progressively illustrated in the side elevational views of FIGS. 11–13. (In all of these figures the canopy bars have been removed for the sake of clarity.) When the fold latches 200 are released and the handle 180 is rotated upwardly and forwardly (FIG. 11), the tops of the support struts 150 are rotated to the rear. This allows the frame to collapse (FIG. 12) all the way to a folded position (FIG. 13) in which the front leg assembly 110 nests on the rear leg assembly 130, and the handle assembly 180 nests on the front leg assembly. The child tray 300 rotates to the rear and nests between the push arms 184. The basket frame 102 nests between the front and the rear leg assemblies.

Figure 14:
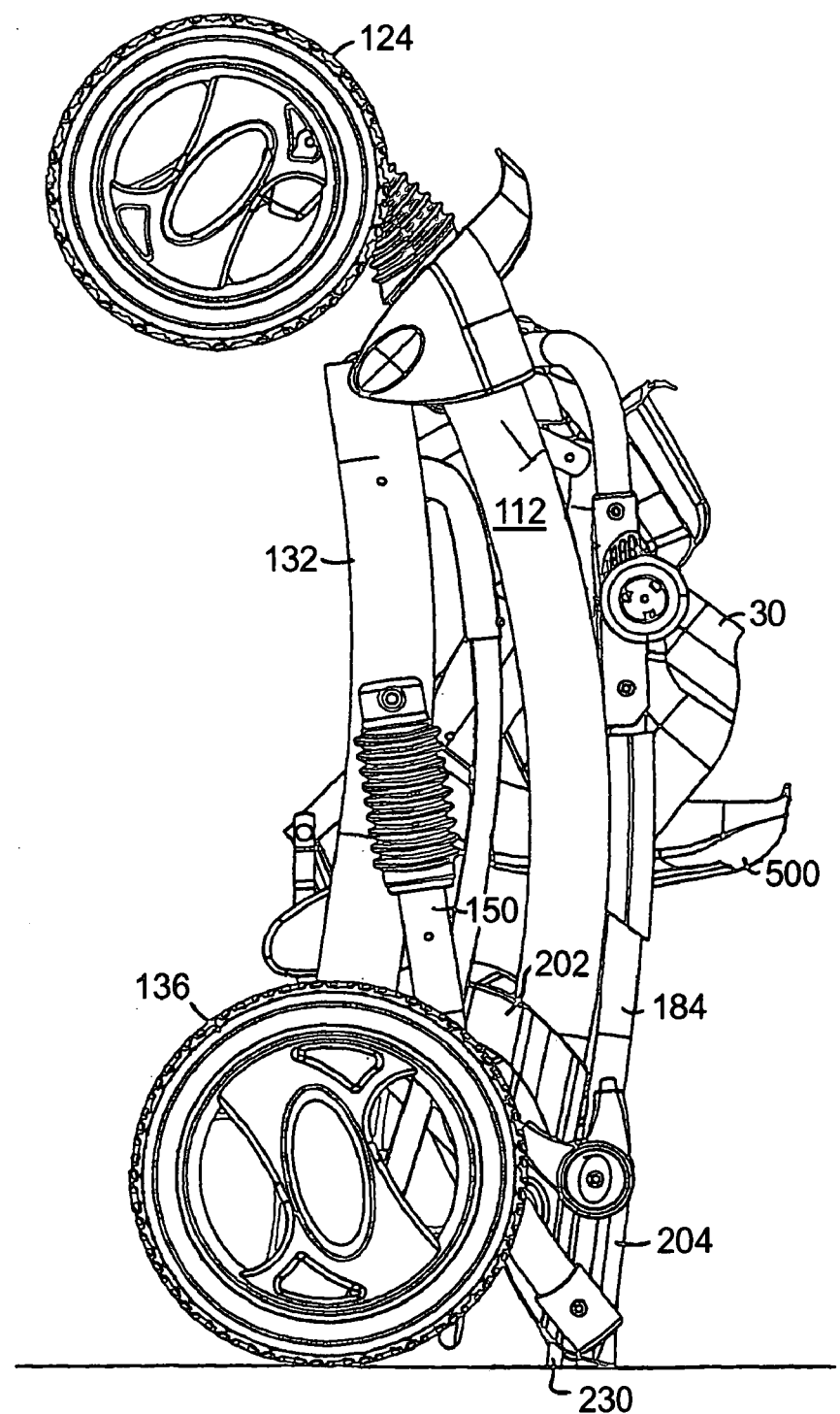
FIG. 14 is a side elevational view of the stroller shown in a folded and upright storage configuration.

Folding is simple and easy because the entire stroller drops to the ground without the user having to control the weight of the stroller as it folds. Folding is accomplished with all four wheels on the ground and the rear legs remaining at close to their initial shallow angle. Unlike some prior art strollers, the seat 10 in the present stroller does not make contact with the ground as the stroller is folded. And it can easily be stood upright for compact vertical storage, resting on the rear wheels 136 and lower latch parts 204 (see FIG. 14).

Fold Latches

FIGS. 7–10 show details of the fold latches 200 and their engagement with the front legs 112 and the push arms 184. The upper and lower latch parts 202, 204 are molded of plastic material, preferably nylon 6. One end of the upper latch part 202 is a pivot portion 210 with a rivet hole 212 aligned with pivot axis 208. Pivot portion 210 fits between a pair of spaced flanges 205 on lower latch part 204. Flanges 205 have aligned rivet holes 207 that are also aligned with pivot axis 208.

Figure 10:
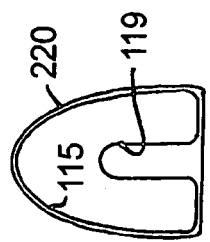
FIG. 10 is a partial cross-sectional view taken along line 10—10 in FIG. 9.

Opposite pivot portion 210 is an anchor portion 214 having a socket 216 that generally closely conforms to the profile of the upper end 113 of front leg 112. As mentioned previously, the upper end of the front leg necks down so that it fits within the fold latch. FIG. 10 schematically illustrates the necked-down or "crushed" cross-section 115 of the upper end 113 of the front leg, in which a longitudinal crease 119 effectively folds the lower portion of the tube up into itself. Thus socket 216 narrows from an entry 218 with an oval cross-section that matches the full oval cross-section of the front leg, to a domed and flat-bottomed cross-section 220. A rivet hole 117 near the tip of the front leg 112 receives the rivet 222 that joins the upper and lower latch parts together through holes 205, 212 and anchors the front leg in the socket 216.

Beneath the entry 218 of socket 216 is a depending receiver 222 having a mouth 224 with a lip 226. The lip and the mouth are adapted to cooperate with a retractable hollow plunger 230 housed in lower latch part 204. The plunger preferably is molded of acetal resin, i.e., polyoxymethylene, or "POM." It is virtually completely shrouded by the latch parts 202, 204 so as to be protected from dust and dirt.

The plunger 230 slides within a cavity 240, guided by the end of the push arm 184 that it surrounds. The push arm is anchored to lower latch part 204 by a rivet 242 through hole 185 (the same rivet that pivotally connects the upper end 152 of support strut 150 at pivot point 206). Rivet 242 passes through a pair of elongated slots 232 in the sides of plunger 230, serving to guide and limit movement of the plunger. A helical spring 244, captured between the proximal end 234 of plunger 230 and a shoulder 246 in cavity 240, biases the plunger outwardly, toward the receiver 222.

Figure 9:
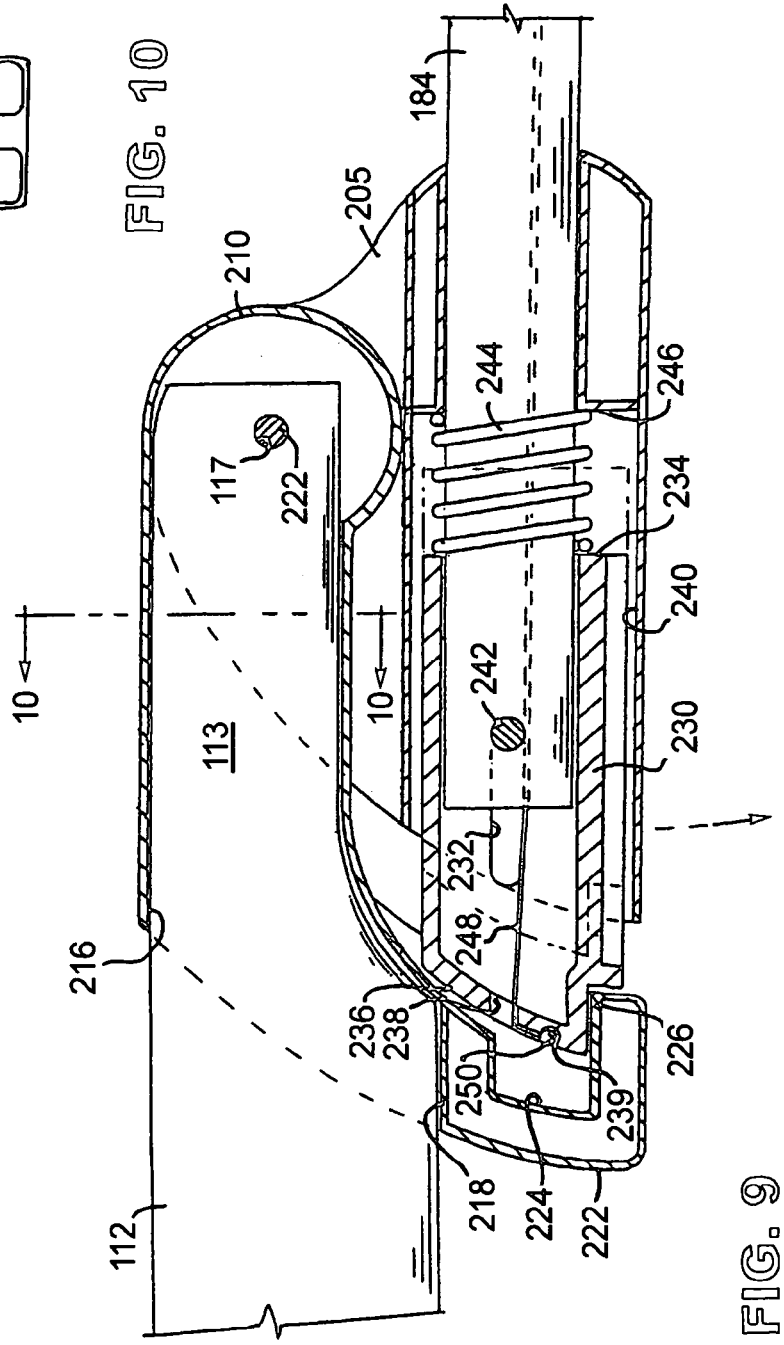
FIG. 9 is a sectional view of the frame latch taken along line 9—9 in FIG. 7.

The distal end 235 of the plunger 230 has a sloped face 236 with a hole 238 and a notched cable-and-ball anchoring recess 239. An actuating cable 248 extends through the handle from rotatable grip 186, as noted above. The cable extends through the interior of plunger 230 and through hole 238, and has a ball end 250 anchored in recess 239. FIG. 9 shows the locked position of the fold latch, with the distal end of plunger 230 retained in mouth 224. When the grip 186 is rotated, cable 248 retracts plunger 230 until its distal end clears lip 226 (i.e., to the dashed line position shown in FIG. 9). The handle 180, which includes push arm 184, then can be rotated counterclockwise as seen in FIG. 9, along with lower latch part 204, to fold the stroller. When the stroller is stored on end (see FIG. 14), the plunger is in contact with the ground but is pushed inwardly. The lower latch part 204 and the wheels 136 thus bear virtually all the weight of the stroller in this position.

When the stroller is to be opened from the folded position, push arm 184 is rotated clockwise. When the distal end 235 of plunger 230 meets lip 226, its sloped face 236 acts as a ramp to push the plunger further into the cavity 240, against the force of spring 244, as the push arm is rotated. When the very tip of the plunger clears the lip 226, the spring forces the plunger into the mouth 224 to lock the frame in the open position.

Child Tray

Figure 2:
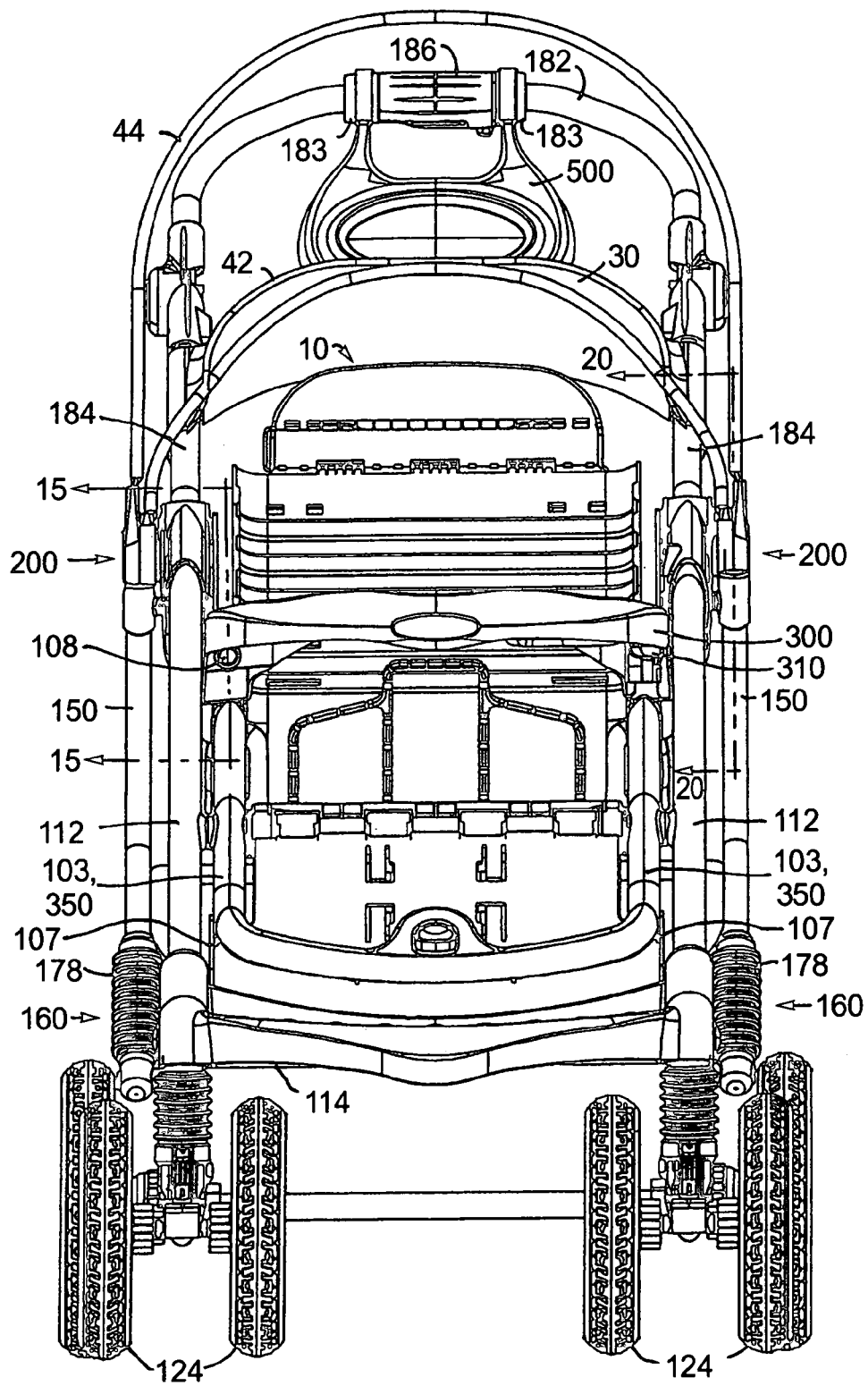
FIG. 2 is a front elevational view of the stroller of FIG. 1.

Referring to FIGS. 1 and 2, a molded plastic child tray 300 is pivotally attached at its right side (on the left as viewed in these two figures) to a longitudinal tubular member 108 (part of right-hand tube 103). Tray 300 thus can be rotated about a fore-and-aft axis so that it can be pivoted upwardly for easier access to the seat 10. The dashed lines in FIG. 1 show this "open" tray position. The sectional view of FIG. 15 shows this pivoting connection. Aligned apertures in the rear wall 302 of the tray and in depending webs 303, 304 surround member 108. A washer 305 also surrounds member 108, just inside rear wall 302, and preferably is secured to rear wall 302. A spring-loaded snap button 306 carried by member 108 retains the tray in position on the member. If the tray is to be removed, snap button 306 is depressed to allow the tray to be slid off member 108.

Figure 16:
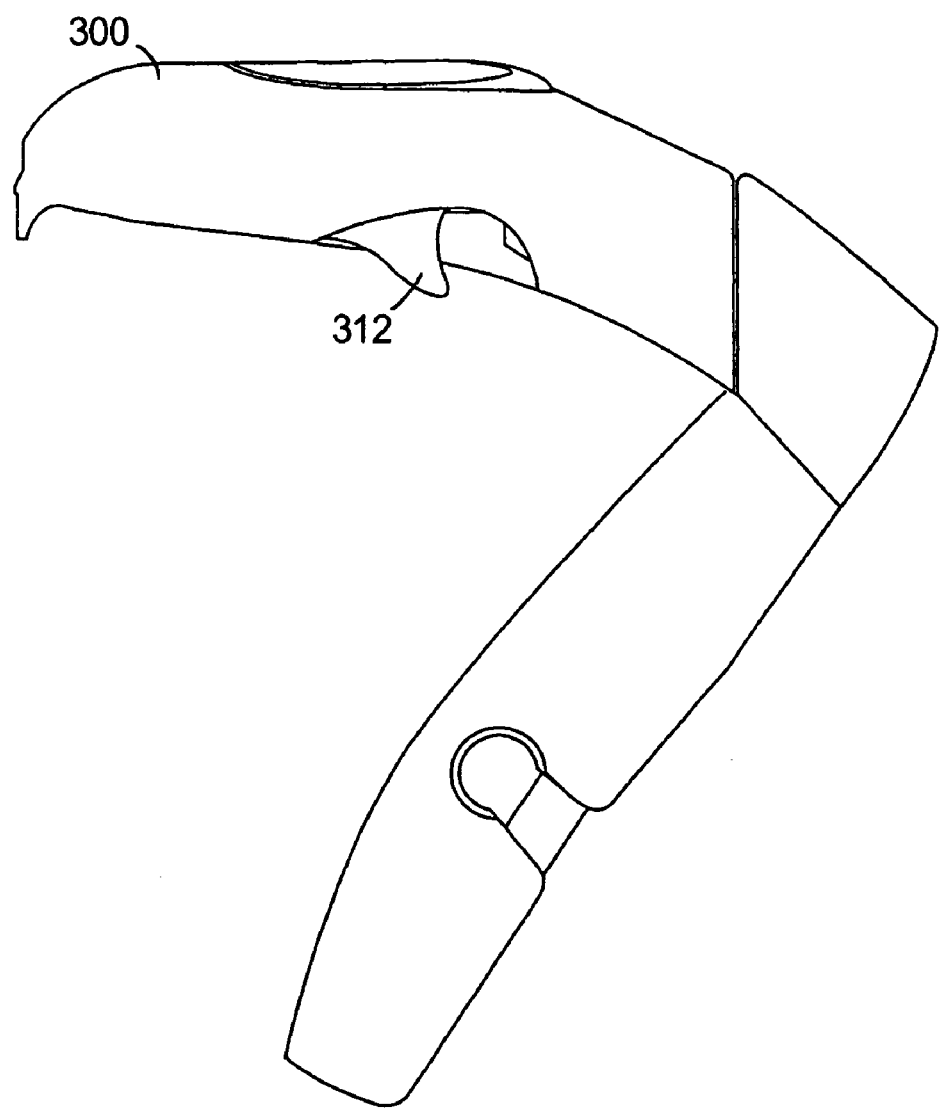
FIG. 16 is a left side elevational view of the child tray.
Figure 17:
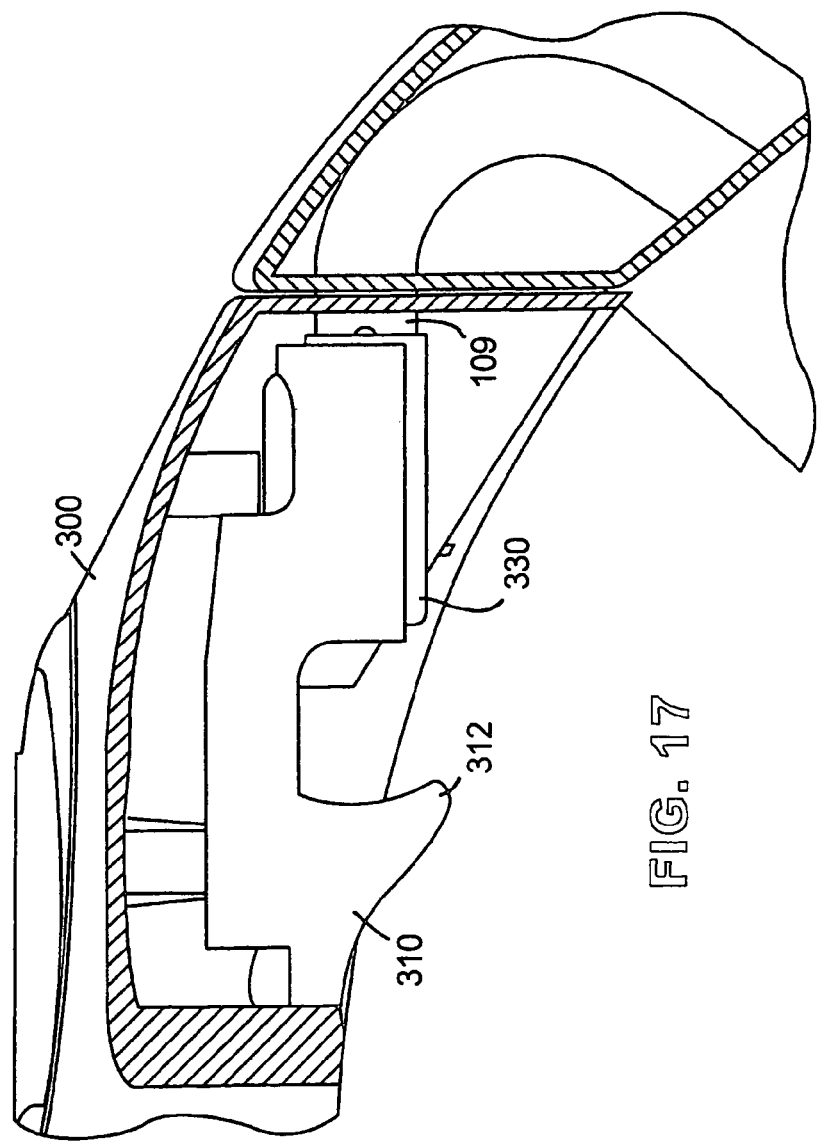
FIGS. 17–19 are vertical sectional perspective views through the child tray and latch therefor taken progressively from left to right.

The left side of the child tray 300 is releasably latched to a similar longitudinal tubular member 109 (part of left-hand tube 103) at the other side of the stroller. FIG. 16 shows in elevation the trigger portion 312 of the tray latch. FIG. 17 is a longitudinal sectional view through the tray latch immediately adjacent to the tray latch, and shows that the trigger portion is part of a latch slide 310 carried by the tray and movable fore-and-aft relative thereto.

Figure 18:
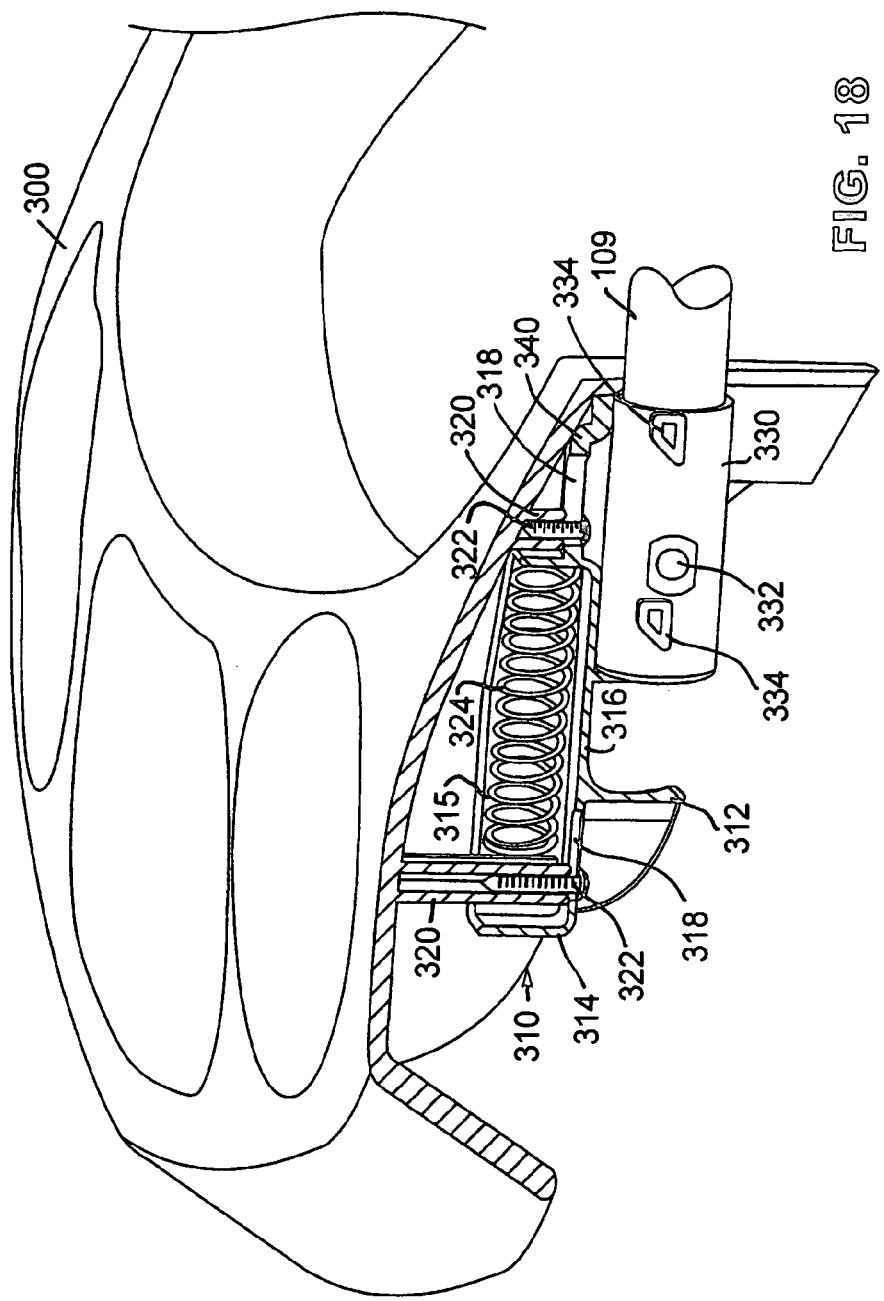

FIG. 18 is a longitudinal sectional view through the center of the latch slide and the surrounding tray structure. The slide 310 has an upwardly open housing 314 defining an inner cavity 315. The bottom wall 316 of the housing has two longitudinally spaced mounting slots 318. Hollow studs 320 on the underside of the tray are similarly spaced apart, and project into the cavity 315. Pan-head mounting screws 322 pass through slots 318 to slidably secure the latch slide to studs 320. A coil spring 324 in cavity 315 engages stud 320 and the rear end of housing 314 to bias the latch slide 310 rearwardly (to the right as seen in FIG. 18). A forward pull on trigger 312 (to the left in FIG. 18) moves the latch slide against the pressure exerted by the spring 324.

Figure 19:
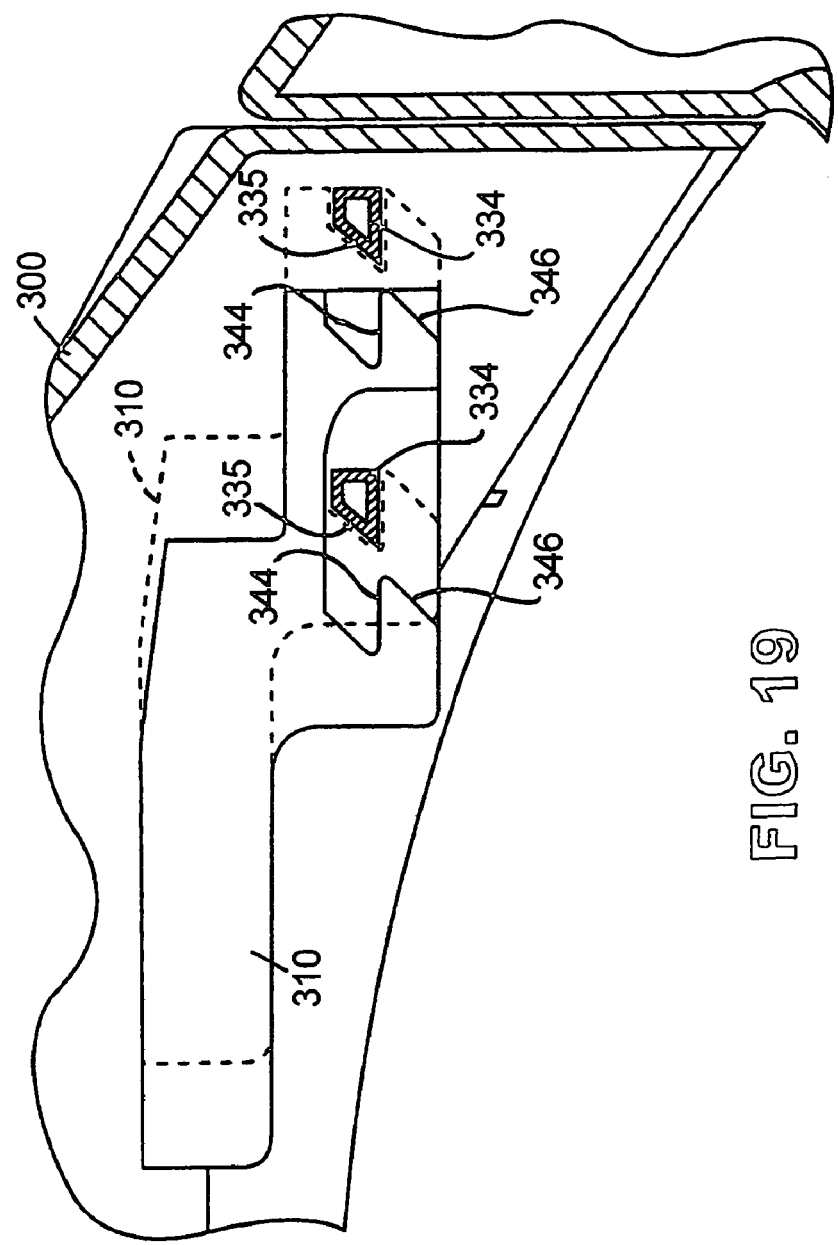

A plastic collar 330 is riveted at 332 to frame-mounted member 109. Collar 330 has two pairs of ramped studs 334 on opposite sides of the collar (only one pair is seen in FIG. 18; the other pair is diametrically opposed to the illustrated pair). The rear portion of latch slide 310 has a downwardly open socket 340 that embraces collar 330. FIG. 19 is a longitudinal sectional view through the right pair of ramped studs 334 at the surface of collar 330. This figure shows that socket 340 has two opposed pairs of ramped notches 344 that mate with ramped studs 334.

The solid outline of latch slide 310 in FIG. 19 shows the slide in the unlatched (trigger-pulled) position, which allows the left side of the tray 300 to be raised away from frame-mounted member 109. The dashed outline of latch slide 310 shows the slide in the trigger-released position. When the tray is down, as shown in this figure, the notches 344 engage the studs 334. When the tray is lowered for latching from the open position with the trigger released, the ramps 346 on the slide 310 ride over the ramps 335 on the studs 334, causing the slide 310 to move forwardly (to the left as seen in FIG. 19) until they clear the studs, whereupon the slide 310 snaps rearwardly (to the right) under spring pressure to close the latch. Thus, simply pressing down on the tray can close the latch.

Car Seat Adapter

Figure 20:
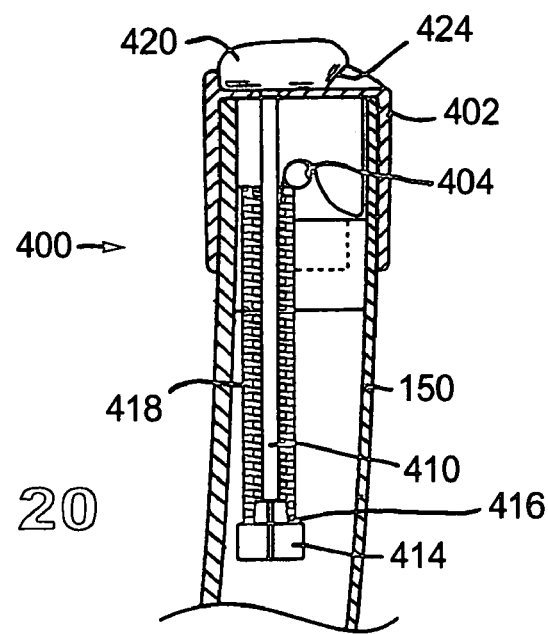
FIG. 20 is a sectional view through a support strut taken along line 20—20 in FIG. 2, showing the child car seat adapter according to the invention.
Figure 21:
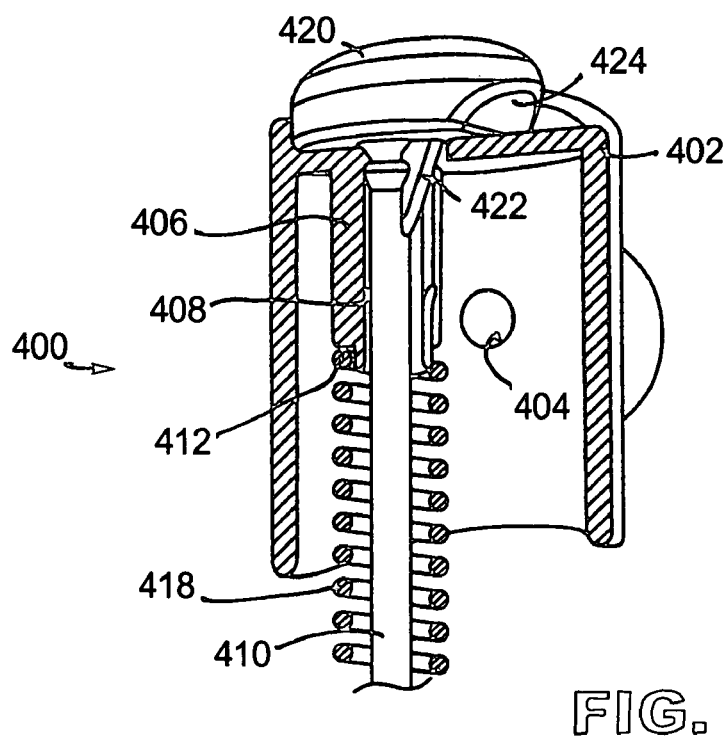
FIG. 21 is a detail perspective view of a portion of the car seat adapter.

One of the support struts 150 is provided with a mechanism 400 for anchoring a child vehicle safety seat, particularly an infant seat, in position on the stroller seat 10. Referring to FIGS. 20 and 21, anchoring mechanism 400 comprises a molded plastic end cap 402 that fits over support strut tube 150 and has a rivet hole 404 through which mounting rivet 242 (FIG. 5) passes to pivotally attach support strut 150 to latch part 204. Cap 402 also has an internal sleeve 406 with a central bore 408 that receives a flexible tether 410. Sleeve 406 also has a seat 412 at its inner (distal) end surrounding the bore 408. The inner end of tether 410 has a stop plug 414 with a seat 416. A helical compression spring 418 surrounds tether 410 and is captured between seats 412 and 416, thus biasing the tether to the retracted position.

The outer end of tether 410 has an enlarged head or knob 420. The knob rests atop end cap 402 when the tether is retracted. Knob 420 is adapted to engage a vehicle safety seat placed on stroller seat 10. It is optionally configured with an angled gusset 422 which is adapted to fit into the standard seat belt slot of the car seat so as to enhance engagement with the car seat. The surface of the knob 420 preferably is made of a non-slip material, such as TPE, to enhance frictional engagement with the car seat. The knob also may be provided with a chamfer 424 to facilitate grasping the knob.

Figure 22:
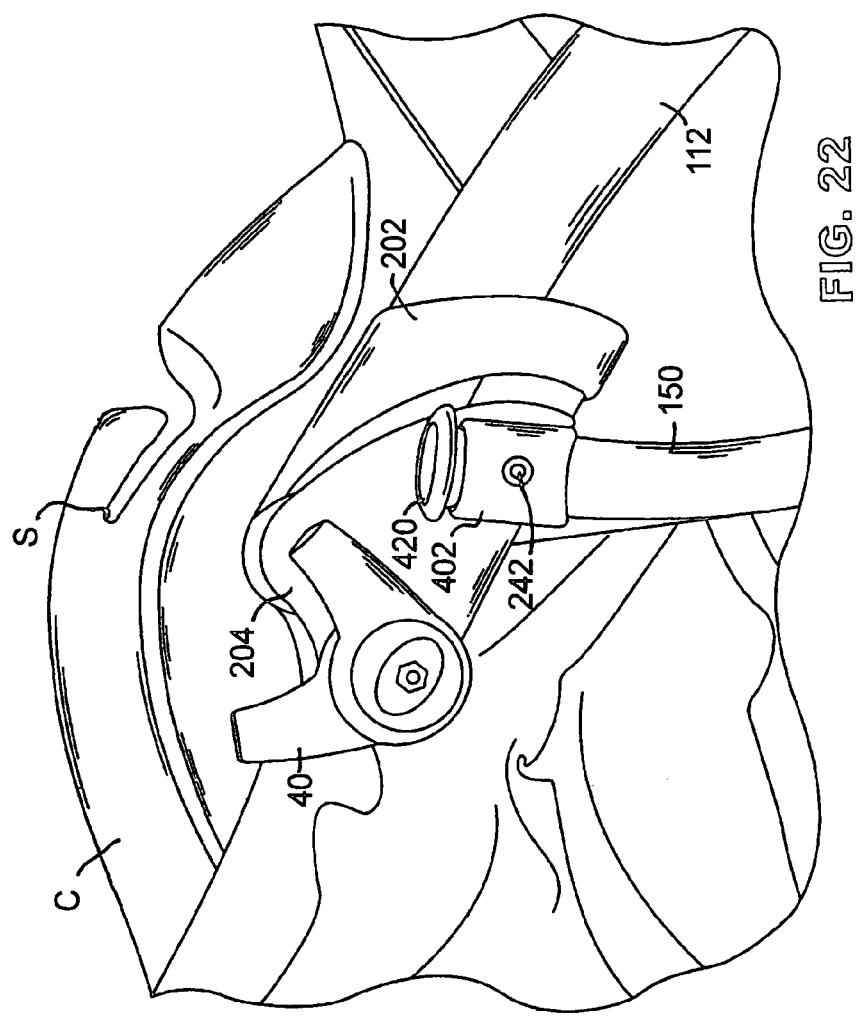
FIGS. 22–25 are partial perspective views of a child car seat on the stroller showing engagement by the car seat adapter.
Figure 23:
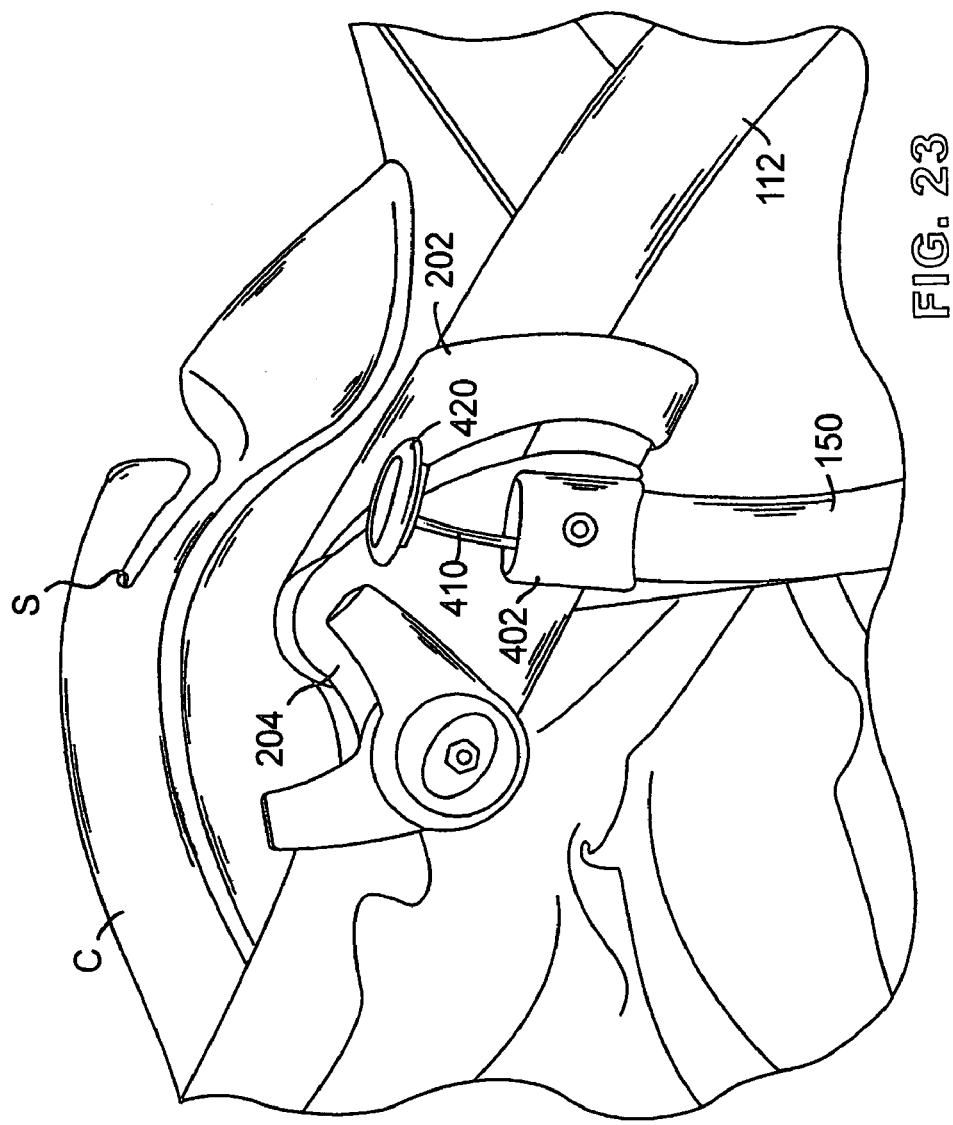
Figure 24:
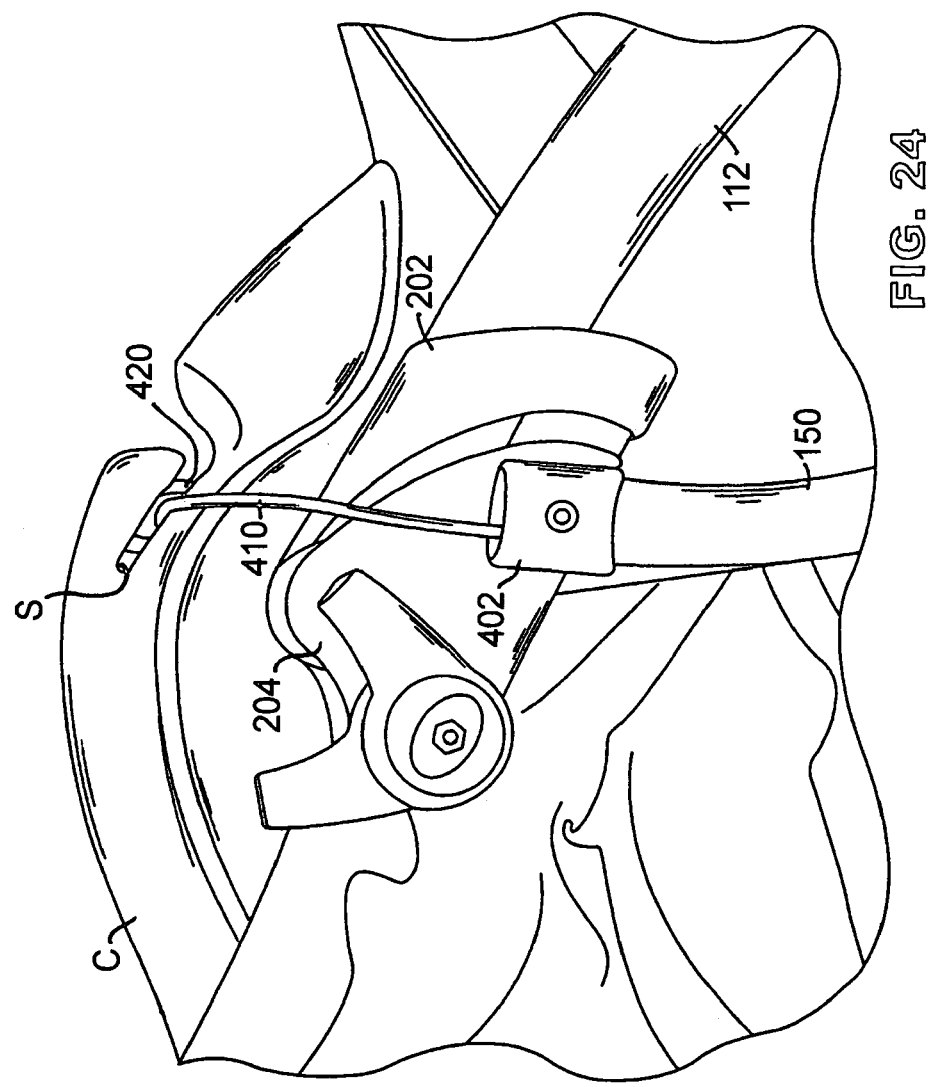
Figure 25:
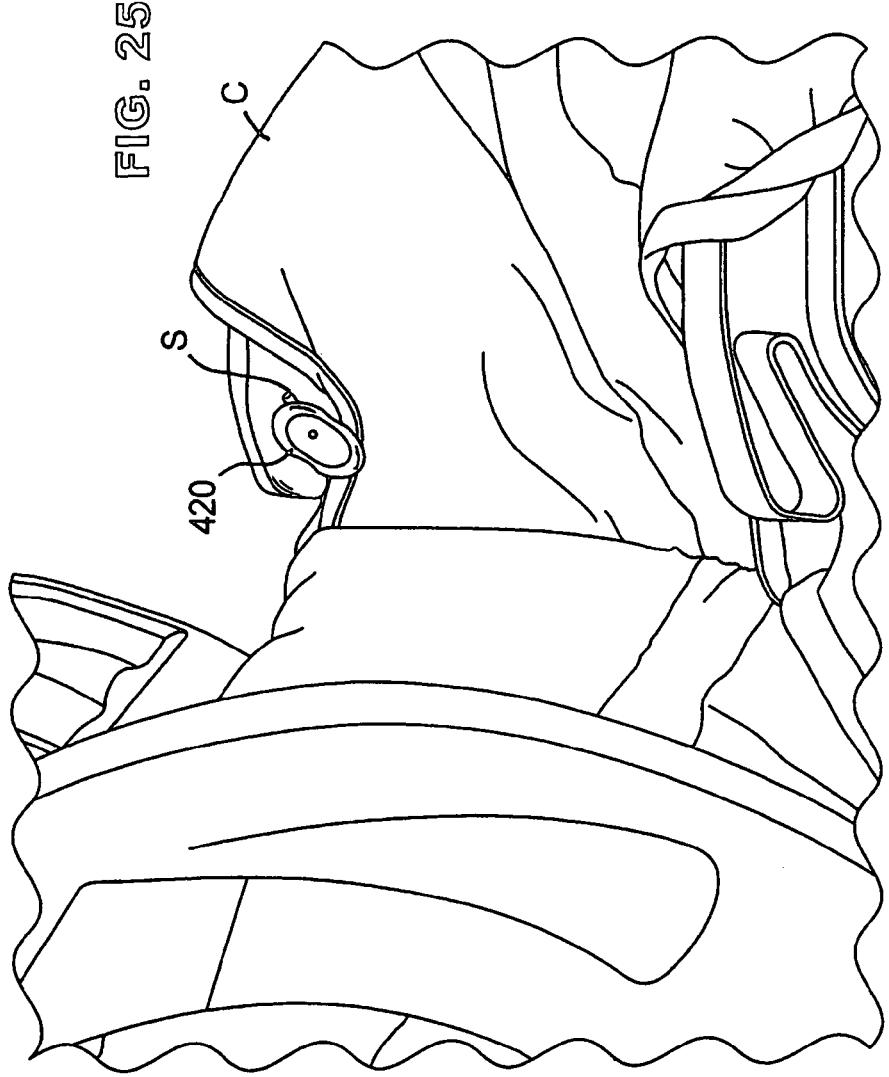

FIGS. 22–25 sequentially illustrate how a car seat C with seat belt slots S is anchored in the stroller. FIG. 22 shows the knob 420 (in a slightly modified form) in its retracted position atop cap 402. FIG. 23 shows the knob 420 raised slightly (the user's hand, which would be grasping knob 420, is omitted for the sake of clarity). FIG. 24 shows the tether 410 extended to the point where it passes through the seat belt slot S, the knob 420 engaging the inside surface of the car seat adjacent the seat belt slot S. FIG. 25 is a view of the same engagement from the opposite side of the car seat.

The arrangement described above can accommodate a wide variety of child seats that have typical seat belt slots at their sides. Tether 410 preferably is in the form of a plastic cable. However, the tether can also be a wire cable or a cord made of a suitable material, such as nylon. Instead of using a compression spring, an extension spring may be used, with the inner end of the spring anchored within the support tube 150. Instead of using a spring surrounding an inelastic cable, the tether can take the simpler form of an elastic cord (e.g., a "bungee" cord), the inner end of which is anchored within the support tube 150, e.g., to the inner end of an elongated sleeve 406. Although only one anchoring mechanism is needed, it is possible to provide an anchoring mechanism in each support strut 150 for tethering both sides of the child seat to the stroller.

Accessory Bridge

Figure 3:
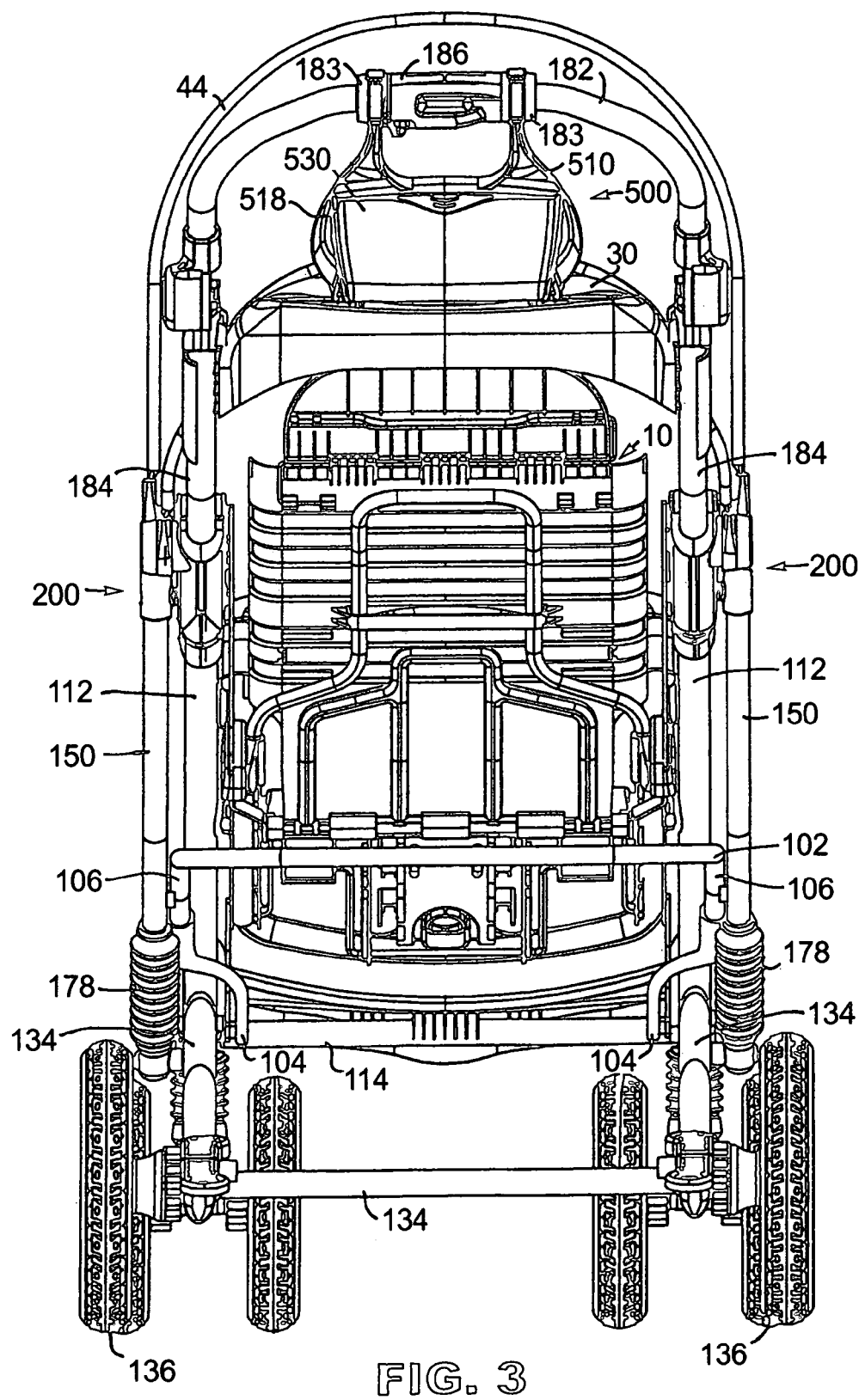
FIG. 3 is a rear elevational view of the stroller.

Referring to FIGS. 1–3, the gap between the handgrip portion 182 of handle 180 and parent console 30 is filled by a useful accessory bridge 500, which can house a cell phone, a radio, keys, facial tissues, baby wipes, and/or other items. The accessory bridge is attached to both the handgrip portion 182 and the top of parent console 30. Accessory bridge 500 consists of two molded plastic parts: a housing 510 (FIG. 26), and a storage compartment 530 (FIG. 27). These two parts mate as shown in FIG. 28.

Figure 27:
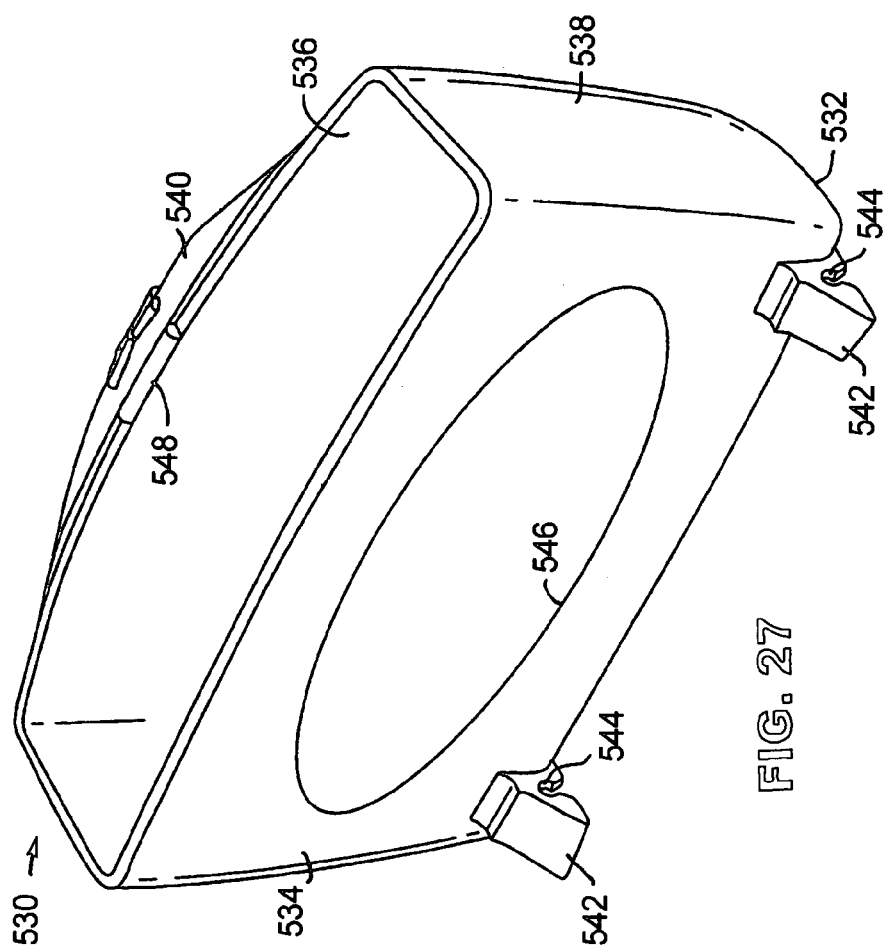
FIG. 27 is a perspective view of another part of the accessory bridge.
Figure 28:
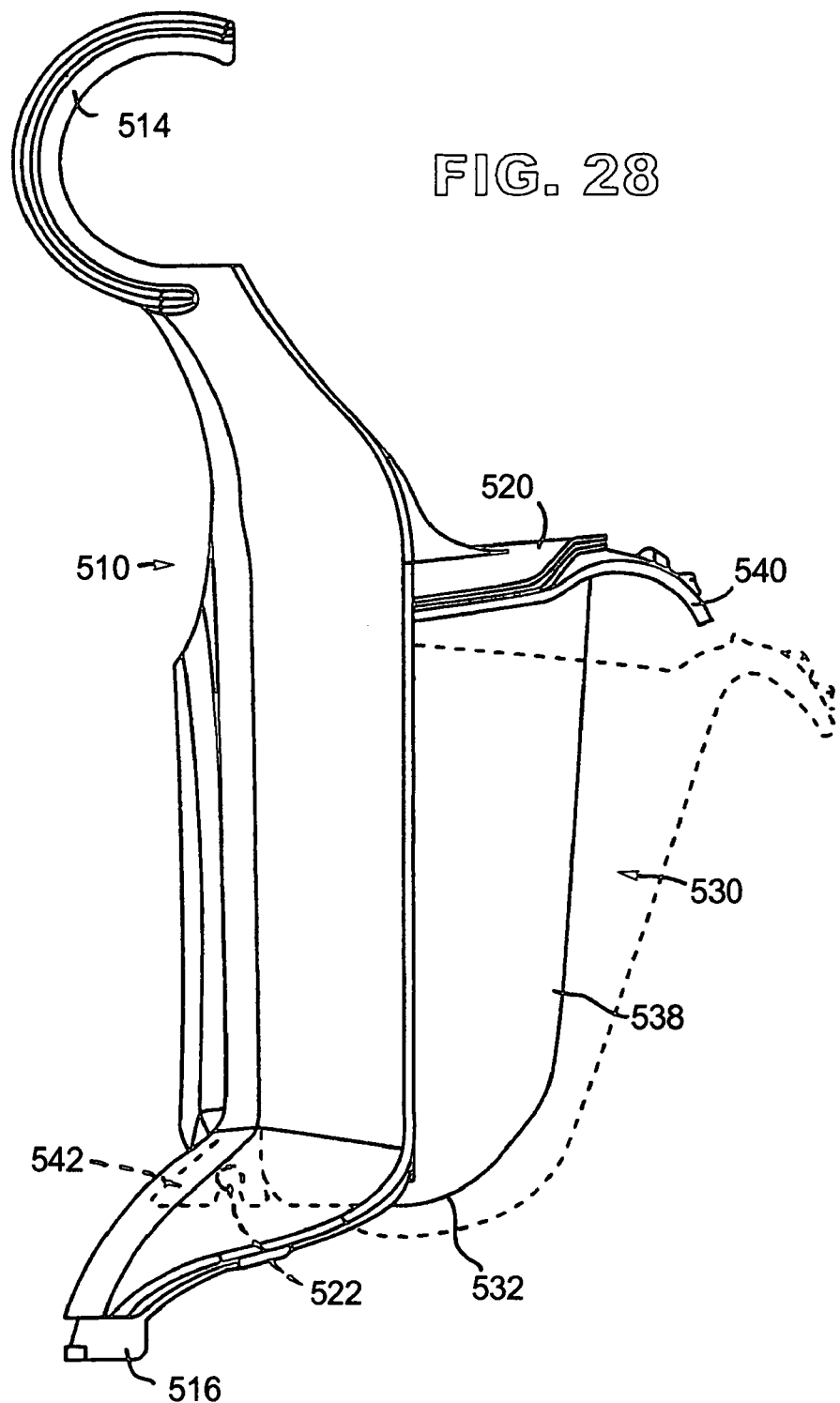
FIG. 28 is a left side elevational view of the accessory bridge.

Referring to FIGS. 27 and 28, storage compartment 530 is in the form of a generally rectangular, open-top, tilt-out bin having a curved bottom wall 532, a front wall 534, a rear wall 536 and side walls 538. A handle in the form of a pull tab 540 projects rearwardly from the upper edge of rear wall 536. The top edge of pull tab 540 has a protrusion 548 that mates with a portion of housing 510, as described below. Two hinges 542 project forwardly from the bottom of front wall 534. Each hinge has notches 544 that snap-fit over a hinge pin in housing 510, as described below. A transparent oval window 546 optionally may be provided in front wall 534.

Figure 26:
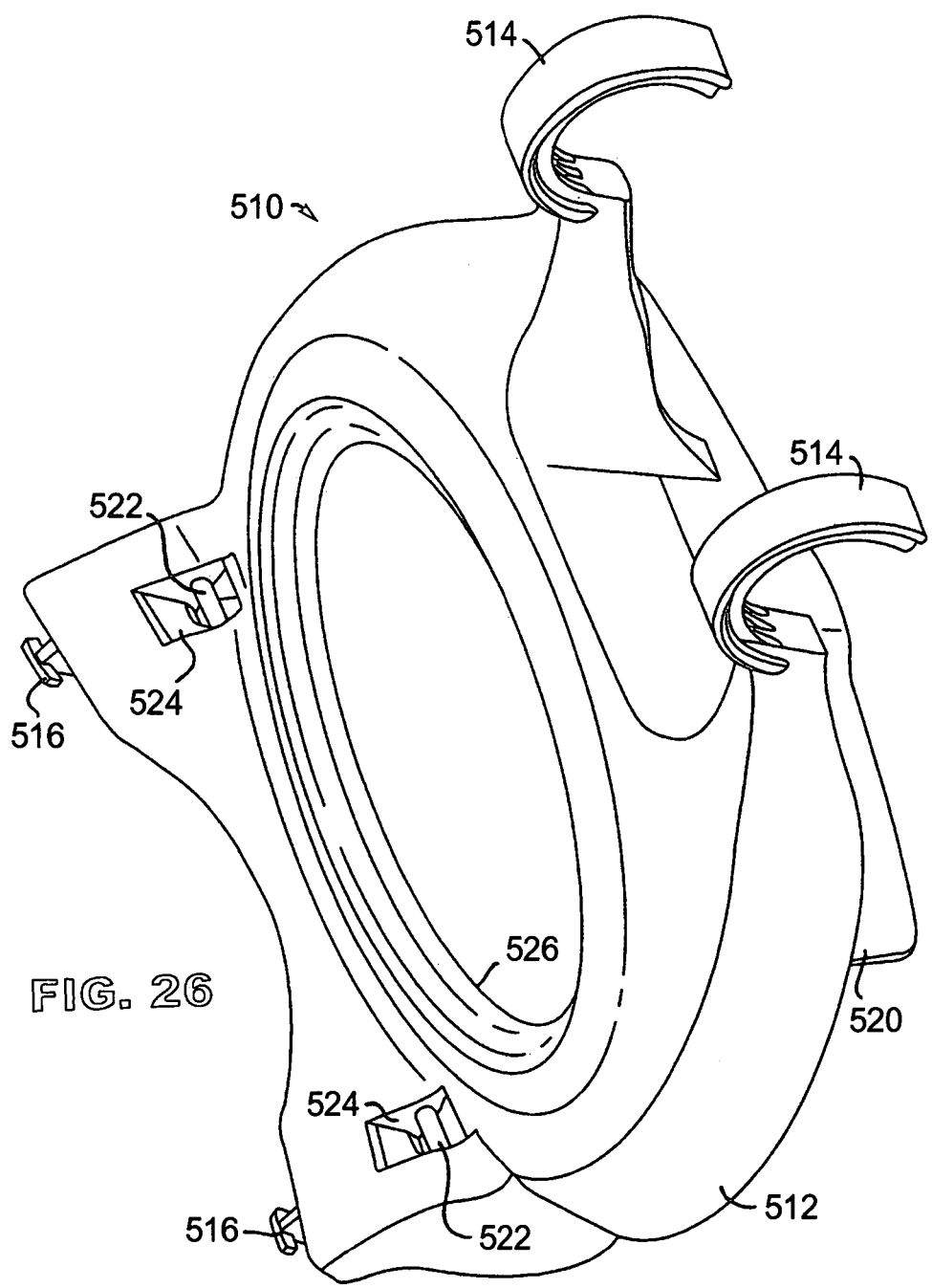
FIG. 26 is a perspective view of a part of the accessory bridge according to the invention.
Figure 29:
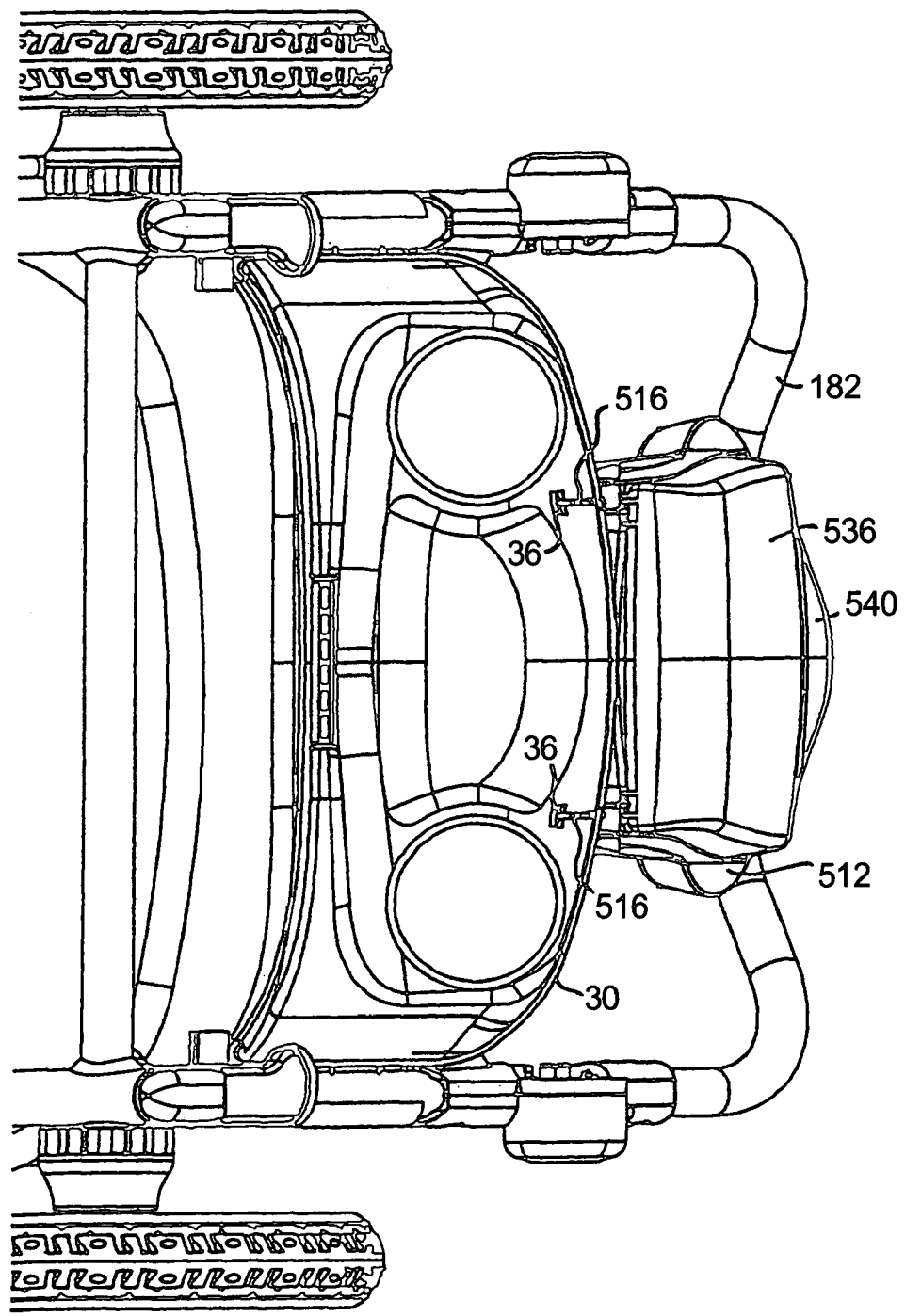
FIG. 29 is a bottom plan view of the rear portion of the stroller.

Referring to FIG. 26, housing 510 comprises a generally oval-shaped body portion 512 having a pair of arms with hooks 514 that snap over the handgrip portion 182 of handle 180, and a pair of T-shaped tabs 516 that engage mating slots 36 in parent console 30 (see FIG. 29). Installation of the housing on the stroller involves first engaging tabs 516 with slots 36, and then snapping hooks 514 over fixed collars 183 on handgrip portion 182. The rear face of body portion 510 has a rectangular opening 518 (see FIG. 3) in which the front portion of storage compartment 530 fits, and an overhang 520 which overlies the upper end of the storage compartment when closed. Hinge pins 522 are formed in through-notches 524 at the lower portion of the front face of the storage compartment. The front face may also have an oval opening 526 through which the contents in storage compartment 530 may be viewed. Alternatively, a pack of tissues or baby wipes may be installed in the housing 510 so that the tissues or baby wipes can be dispensed through opening 526.

The two parts of accessory bridge 500 are assembled as follows. The lower end of storage compartment 530 is inserted into the opening 518 in the rear of housing 510 such that the hinges 542 project through notches 524 and snap over hinge pins 522 (see FIG. 28). Then the upper portion of storage compartment 530 is swung forwardly to its closed position, with the overhang 520 overlying its upper end. The storage compartment 530 is held in the closed position by at least one protrusion (not shown) on the underside of overhang 520 that resiliently mates with protrusion 548 on the storage compartment, thus acting as a latch. In the closed position there is sufficient space between the front wall 534 of storage compartment 530 and the opening 526 in housing 510 to accommodate a flat pack of tissues or baby wipes, as previously described.

The shape of the housing 510 is not limited to an oval. A housing of any shape and size that would fit in the space above the parent console 30 would be satisfactory from a utilitarian standpoint. Similarly, the opening 526 in the housing 510 and the window 546 in the storage compartment 530 can take any shape. Additional compartments, slots or other discrete storage areas could be included in either the housing 510 or the storage compartment 530. Instead of being attached to the handgrip portion 182, the accessory bridge could be configured to attach to other portions of the handle 180. While molded plastic parts are preferred, the accessory bridge could be constructed of a metal framework that attaches to the handgrip and the parent console and is surrounded by soft storage pouches made of fabric or vinyl. Alternatively the accessory bridge could be constructed entirely of soft material and have straps that attach to the handgrip and the parent console.

The stroller disclosed herein thus provides enhanced utility and advantages as compared to those of the prior art.

The invention claimed is:

1. A stroller comprising:
    a stroller frame foldable between an open position and a folded position, the stroller frame comprising left and right support struts pivotally attached to other portions of the stroller frame and configured to pivot downwardly as the stroller frame moves to its folded position, and upwardly as the stroller frame moves to its open position, the left and right support struts having left and right protrusions, respectively, on the inboard faces thereof;
    a seat supported by the stroller frame, the seat comprising a seat back and a seat bottom; and
    a basket frame configured to support a basket, the basket frame positioned below the seat and comprising left and right side legs pivotally mounted to the stroller frame for movement between a raised position and a lowered position, the left and right side legs being slidably supported on the left and right protrusions, respectively,
    whereby pivotal movement of the support struts during folding or unfolding of the stroller frame effects pivotal movement of the basket frame between its raised and lowered positions.

2. A stroller according to claim 1, wherein the basket frame comprises an end portion joined to the side legs remotely from the pivotal mountings of the side legs so as to form a U-shaped basket frame extending rearwardly from the pivotal mountings of the side legs.

3. A stroller according to claim 2, wherein the side legs of the basket frame are pivoted toward the front of the stroller frame, and the end portion of the basket frame is disposed toward the rear of the stroller frame.

4. A stroller according to claim 3, wherein the support struts of the stroller frame rotate rearwardly and downwardly during folding of the stroller frame and forwardly and upwardly during unfolding of the stroller frame.

5. A stroller comprising:
a stroller frame foldable between an open position and a folded position, the stroller frame comprising at least one support strut pivoted to another portion of the stroller frame, the at least one support strut having a protrusion on an inboard face thereof;
a seat supported by the stroller frame, the seat comprising a seat back and a seat bottom; and
a basket frame configured to support a basket, the basket frame positioned remotely from and below the seat bottom and comprising at least one side leg pivotally mounted to the stroller frame at a location remote from the protrusion, the at least one side leg being slidably supported on the protrusion,
where by pivotal movement of the at least one support strut during folding or unfolding of the stroller frame effects slidable movement of the at least one side leg of the basket frame on the protrusion and pivotal movement of the basket frame between a raised position below the seat bottom and a lowered position below the seat bottom.

6. A stroller according to claim 5, wherein the side leg is mounted to the stroller frame for pivotal movement between the raised position and the lowered position.

7. A stroller according to claim 5, wherein the at least one support strut includes left and right support struts pivoted to other portions of the frame, the left and right support struts having left and right protrusions, respectively, on the inboard faces thereof; and wherein the at least one side leg includes left and right side legs pivotally mounted to the stroller frame at a location remote from the left and right protrusions; and wherein the left and right side legs are slidably supported on the left and right protrusions, respectively.

8. A stroller according to claim 7, wherein the basket frame comprises an end portion joined to ends of the left and right side legs opposite the pivotal mountings of the left and right side legs so as to form a U-shaped basket frame.

9. A stroller comprising:
a stroller frame foldable between an open position and a folded position, the stroller frame comprising at least one support strut pivoted to another portion of the stroller frame and configured to pivot downwardly as the stroller frame moves to its folded position, and upwardly as the stroller frame moves to its open position, the at least one side member having a protrusion on an inboard face thereof;
a seat supported by the stroller frame, the seat comprising a seat back and a seat bottom; and
a basket frame configured to support a basket, the basket frame positioned below the seat bottom and comprising at least one side leg pivotally mounted to the stroller frame for movement between a raised position in the open position of the stroller frame and a lowered position in the folded position of the stroller frame, the at least one side leg slidably resting on the protrusion
whereby pivotal movement of the at least one support strut during folding or unfolding of the stroller frame pivots the basket frame between its raised and lowered positions beneath the seat bottom.

10. A stroller according to claim 9, further comprising:
two of the support struts, one on each side of the stroller frame;
two frame bottom parts, one on each side of the stroller frame extending from a front wheel to a rear wheel of the stroller, each support strut extending upward from a respective one of the frame bottom parts;
two of the protrusions, one on the inboard face of each support strut; and
two side legs of the basket frame, each pivotally mounted to one of the frame bottom parts between the respective front wheel and the respective support strut.

* * * * *

UNITED STATES PATENT AND TRADEMARK OFFICE
CERTIFICATE OF CORRECTION

| | | |
|---|---|---|
| PATENT NO. | : 7,185,909 B2 | Page 1 of 2 |
| APPLICATION NO. | : 11/272753 | |
| DATED | : March 6, 2007 | |
| INVENTOR(S) | : Espanshade et al. | |

It is certified that error appears in the above-identified patent and that said Letters Patent is hereby corrected as shown below:

Title page
Page 1, Item (56), References Cited,

U.S. Patent Documents, please insert the following documents:
-- 3,443,823  5/1969  Muenchner
   4,023,825  05/1977  Kassai
   5,388,852  02/1995  Bigo
   6,068,284  05/2000  Kakuda --

Item [56]
Foreign Patent Documents, please add the following documents:
-- FR 2 648 102     12/1990
   DE 200 16 773    01/2001
   DE 42 29 857     03/1994
   GB 770 115       03/1957 --

Non Patent Literature Documents, please add the following documents:

Item [56]
Search Report dated November 13, 2006 issued in French patent application no. 03 05066
Search Report dated November 15, 2006 issued in French patent application no. 03 05067

UNITED STATES PATENT AND TRADEMARK OFFICE
CERTIFICATE OF CORRECTION

PATENT NO. : 7,185,909 B2
APPLICATION NO. : 11/272753
DATED : March 6, 2007
INVENTOR(S) : Espanshade et al.

It is certified that error appears in the above-identified patent and that said Letters Patent is hereby corrected as shown below:

In the claims:
Column 11
Claim 5, line 23, please delete "where by" and replace with -- whereby --
Column 12
Claim 9, line 23, delete "protrusion" and replace with -- protrusion, --

Signed and Sealed this

Twenty-second Day of May, 2007

JON W. DUDAS
*Director of the United States Patent and Trademark Office*